United States Patent
Patience et al.

(10) Patent No.: US 12,522,775 B2
(45) Date of Patent: Jan. 13, 2026

(54) NATURAL GAS REFINING UNIT FOR INTEGRATION AT A BATTERY SITE OF AN OIL PRODUCTION FACILITY

(71) Applicant: POLYVALOR, LIMITED PARTNERSHIP, Montreal (CA)

(72) Inventors: Gregory Patience, Mount-Royal (CA); Federico Galli, Sherbrooke (CA)

(73) Assignee: POLYVALOR, LIMITED PARTNERSHIP, Montréal (CA)

( * ) Notice: Subject to any disclaimer, the term of this patent is extended or adjusted under 35 U.S.C. 154(b) by 148 days.

(21) Appl. No.: 18/549,674

(22) PCT Filed: Mar. 15, 2022

(86) PCT No.: PCT/CA2022/050385
§ 371 (c)(1),
(2) Date: Sep. 8, 2023

(87) PCT Pub. No.: WO2022/193003
PCT Pub. Date: Sep. 22, 2022

(65) Prior Publication Data
US 2024/0158708 A1    May 16, 2024

Related U.S. Application Data

(60) Provisional application No. 63/161,502, filed on Mar. 16, 2021.

(51) Int. Cl.
*B01D 17/02*    (2006.01)
*B01J 8/18*    (2006.01)
(Continued)

(52) U.S. Cl.
CPC ............. *C10L 3/106* (2013.01); *B01D 17/02* (2013.01); *B01J 8/1836* (2013.01); *B01J 8/24* (2013.01);
(Continued)

(58) Field of Classification Search
CPC ............ B01D 17/02; B01J 2208/00106; B01J 8/1836; B01J 8/24; C02F 1/40;
(Continued)

(56) References Cited

U.S. PATENT DOCUMENTS 4,108,891 A    8/1978    Hattori et al.
9,255,051 B2    2/2016    Gaffney et al.
(Continued)

FOREIGN PATENT DOCUMENTS

EP    0168826 A1    1/1986

OTHER PUBLICATIONS

Seo, Y.S., Shirley, A., Kolaczkowski, S., Evaluation of thermodynamically favourable operating conditions for production Sichinga, J., Buchanan, A., Unlocking the Potential Wealth of Coal Introducing Sasol's Unique Coal-To-Liquids Technology, Johannesburg; 2005. of hydrogen in three different reforming technologies, J Power Sources, 2002; 108(1):213-225.
(Continued)

*Primary Examiner* — Ellen M Mcavoy
*Assistant Examiner* — Chantel Graham
(74) *Attorney, Agent, or Firm* — Lavery, de Billy, L.L.P.; Isabelle Pelletier

(57) ABSTRACT

There is provided a natural gas refining unit and a method for converting natural gas into a refined product at a battery site of an oil production facility. The refining unit comprises an optional vapor-liquid separator configured to separate an oil-water emulsion from a pipeline of the battery site into a liquid phase and a gas phase comprising natural gas, and a reactor, or a plurality of reactors connected in series, configured to convert natural gas from the vapor-liquid separator or, when the vapor-liquid separator is absent, from a treater of the battery site into the refined product. The method comprises the steps of collecting the natural gas at
(Continued)

the battery site and feeding the natural gas to a natural gas refining unit.

20 Claims, 8 Drawing Sheets

(51) Int. Cl.
| | |
|---|---|
| *B01J 8/24* | (2006.01) |
| *C02F 1/40* | (2023.01) |
| *C10G 33/00* | (2006.01) |
| *C10L 3/10* | (2006.01) |
| *C02F 101/32* | (2006.01) |
| *C02F 103/36* | (2006.01) |

(52) U.S. Cl.
CPC ............... *C02F 1/40* (2013.01); *C10G 33/00* (2013.01); *B01J 2208/00106* (2013.01); *C02F 2101/32* (2013.01); *C02F 2103/365* (2013.01); *C10L 2290/02* (2013.01); *C10L 2290/06* (2013.01); *C10L 2290/08* (2013.01)

(58) Field of Classification Search
CPC .. C02F 2101/32; C02F 2103/365; C10G 2/00; C10G 33/00; C10L 2290/02; C10L 2290/06; C10L 2290/08; C10L 3/106; Y02E 60/10
See application file for complete search history.

(56) References Cited

U.S. PATENT DOCUMENTS

| | | | |
|---|---|---|---|
| 9,556,092 | B2 | 1/2017 | Msser et al. |
| 10,287,224 | B2 | 5/2019 | Pawlak et al. |
| 2010/0186824 | A1* | 7/2010 | Bowe .................. B01J 8/04 |
| | | | 422/639 |

OTHER PUBLICATIONS

Smith, J., Intrinsic safety in hazardous locations, Plant Eng., Jul. 8, 2004, available online at URL: https://www.plantengineering.com/articles/intrinsic-safety-in-hazardous-locations/; accessed: Mar. 3, 2021.

Smith, M.W., Shekhawat, D., Chapter 5—catalytic partial oxidation, In: Shekhawat, D., Spivey, J.J., Berry, D.A., editors, Fuel Cells: Technologies for Fuel Processing, Amsterdam: Elsevier; 2011, p. 73-128.

Towler, G., Sinnott, R., editors, Chemical Engineering Design (Second Edition); second edition ed. Boston: Butterworth-Heineman, 2013.

Trevisanut, C., Jazayeri, S.M., Bonkane, S., Neagoe, C., Mohamadalizadeh, A., Boffito, D.C et al., Micro-syngas technology options for GTL, Can J Chem Eng, 2016, 94:613-622.

Trippe, F., Fröhling, M., Schultmann, F., Stahl, R., Henrich, E., Dalai, A., Comprehensive techno-economic assessment of dimethyl ether (DME) 36 synthesis and Fischer-Tropsch synthesis as alternative process steps within biomass-to-liquid production, Fuel Process Technol, 2013, 106:577-586.

Tsagkari, M., Couturier, J.L., Kokossis, A., Dubois, J.L., Early-stage capital cost estimation of biorefinery processes: A comparative study of heuristic techniques, ChemSusChem, 2016, 9:2284-2297.

Tucker, C.L., Claeys, M., van Steen, E., Decoupling the deactivation mechanisms of a cobalt Fischer-Tropsch catalyst operated at high conversion and 'simulated' high conversion, Catal Sci Technol, 2020, 10:7056-7066, doi:10.1039/D0CY00929F.

Tucker, C.L., van Steen, E., Activity and selectivity of a cobalt-based Fischer-Tropsch catalyst operating at high conversion for once-through biomass-to-liquid operation, Catal Today, 2018, 342:115-123.

Urasaki, K., Kado, S., Kiryu, A., Imagawa, K.i., Tomishige, K., Horn, R., et al., Synthesis gas production by catalytic partial oxidation of natural gas using ceramic foam catalyst, Appl Catal A, 2018, 299:219-228.

Valle, C.R., Perales, A.V., Vidal-Barrero, F., Gomez-Barea, A., Techno-economic assessment of biomass-to-ethanol by indirect fluidized bed gasification: Impact of reforming technologies and comparison with entrained flow gasification, Appl Energy, 2013, 109:254-266.

Velasco, J.A., Fernandez, C., Lopez Nina, L.G., Cabrera, S., Boutonnet, M., Jars, S.G., Catalytic partial oxidation of methane over nickel and ruthenium-based catalysts under low O2/CH4 ratios and with addition of steam, Fuel, 2015, 153:192-201.

Weber, R.S., Snowden-Swan, L.J., The economics of numbering up a chemical process enterprise, J Adv Manufact & Proc, 2019, 1.

Weinberg, F., Combustion temperatures: The future? Nature, 1971, 233:239-241.

Wierzba, I., Wang, Q., The flammability limits of H2—CO—CH4 mixtures in air at elevated temperatures, Int J Hydrog Energy, 2006, 31:485-489.

Wright, H.A., Allison, J.D., Jack, D.S., Lewis, G.H., Landis, S.R., ConocoPhillips GTL Technology: The COPox Process as the SynGas Generator, ACS Division of Fuel Chemistry, 2003, 48(2):791-792.

67. Yang, Q., Yang, Q., Man, Y., Zhang, D., Zhou, H., Technoeconomic and environmental evaluation of oil shale to liquid fuels process in comparison with conventional oil refining process, J Clean Prod, 2020, 255:120198.

Zlochower, I.A., Experimental flammability limits and associated theoretical flame temperatures as a tool for predicting the temperature dependence of these limits, J Loss Prev Process Ind, 2012, 25:555-560.

Alberta Energy Regulator, How are wells abandoned?, webpage available at URL: https://www.aer.ca/regulating-development/project-closure/suspension-and-abandonment/how-are-wells-abandoned, accessed: Mar. 3, 2020.

Banaszkiewicz, T., Chorowski, M., Gizicki, W., Comparative analysis of cryogenic and PTSA technologies for systems of oxygen production, AIP Conference Proceedings; 1573(1), 2014, 1373-1378, doi:10.1063/1.4860866.

Basini, L., Aasberg-Petersen, K., Guarinoni, A., Ostberg, M., Catalytic partial oxidation of natural gas at elevated pressure and low residence time, Catal Today, 2001, 64:9-20.

Basini, L.E., Guarinoni, A., Short contact time catalytic partial oxidation (SCT-CPO) for synthesis gas processes and olefins production, Ind Eng Chem Research, 2013, 52:17023-17037.

Bitter, Johannes H., Torres, H. et al., Supported Iron Nanoparticles as Catalysts for Sustainable Production of Lower Olefins, Science, 2012, vol. 335: 835-838.

Blumberg, T., Morosuk, T., Tsatsaronis, G., A Comparative Exergoeconomic Evaluation of the synthesis routes for methanol production from natural gas, Applied Sciences, 2017, 7:1-23.

Carbon Footprint Ltd, 2020 Grid Electricity Emissions Factors v1.1, Country specific electricity grid greenhouse gas emission factors, last updated Jun. 2020, available at URL: https://www.carbonfootprint.com/docs/2020_06_emissions_factors_sources_for_2020_electricity_v1_1.pdf, accessed: Mar. 3, 2021.

Chein, R.Y., Hsu, W.H., Thermodynamic analysis of syngas production via tri-reforming of methane and carbon gasification using flue gas from coal-fired power plants, J Clean Prodz, 2018, 200:242-258.

Chen, Y., Xu, J., The shale gas boom in the US: Productivity shocks and price responsiveness, J Clean Prod., 2019, 229:399-411.

Chin, Y.H., Buda, C., Neurock, M., Iglesia, E., Reactivity of chemisorbed oxygen atoms and their catalytic consequences during CH4—O2 catalysis on supported Pt clusters, J Am Chem Soc., 2011, 133:15958-15978.

Chin, Y.H.C., Buda, C., Neurock, M., Iglesia, E., Selectivity of chemisorbed oxygen in C—H bond activation and CO oxidation and kinetic consequences for CH4—O2 catalysis on Pt and Rh clusters, J Catal, 2011, 283:10-24.

Chin, Y.H.C., Iglesia, E., Elementary steps, the role of chemisorbed oxygen, and the effects of cluster size in catalytic CH4—O2 reactions on palladium, J Phys Chem C, 2011, 115:17845-17855.

(56) References Cited

OTHER PUBLICATIONS

Choudhary, V.R., B, P., M, R.A., Beneficial Effects of Noble Metal Addition to Ni/Al2O3 Catalyst for Oxidative Methane-to-Syngas Conversion, J Catal, 1995, 157:752-754.

CompactGTL Limited, CompactGTL's project in Kazakhstan—the world's first fully commercial modular GTL plant, webpage available at URL: http://www.compactgtl.com/about/projects/; accessed: Mar. 3, 2021.

Couper, J.R., Hertz, D.W., Smith, F.L., In: Towler, G., Sinnott, R., editors. Perry's chemical engineers' handbook; ninth edition ed. New York: McGraw-Hill, 2008.

Denchak, M., Paris Climate Agreement: Everything You Need to Know, 2018.

Dry, M.E., The Fischer-Tropsch process: 1950-2000, Catal Today, 2002, 71:227-241.

Dybkjaer, I., Aasberg-Petersen, K., Synthesis gas technology large-scale applications, Can J Chem Eng, 2016, 94:607-612, 35.

Enger, B.C., Lodeng, R., Holmen, A., A review of catalytic partial oxi-dation of methane to synthesis gas with emphasis on reaction mechanisms over transition metal catalysts, Appl Catal A, 2008, 346:1-27.

Frost, L., Elangovan, E., Hartvigsen, J., Production of synthetic fuels by high-temperature co-electrolysis of carbon dioxide and steam with Fischer-Tropsch synthesis, Can J Chem Eng, 2016, 94:636-641.

Garnett, D., Patience, G., Why do scale-up power laws work? Chem Eng Prog, 1993, 89:76-78.

Gregory S., P., Daria C., B., Distributed production: Scale-up versus Experience, J Adv Manufact & Proc, 2020, 2:e10039.37.

Greyrock Energy, Inc., Technology, Greyrock Chemical and Fuel Production, M-50 gas-to-liquid system, webpage available at URL: http://www.greyrock.com/technology/, accessed: Mar. 3, 2021.

Hargreaves, N., Roll out of smaller scale GTL technology at ENVIA Energy's plant in Oklahoma City, USA; Presentation at the Gastech Exhibition and Conference, Tokyo, 2017, URL: https://www.velocys.com/press/ppt/Gastech2017_Velocys_FINAL_4.3_web.pdf, accessed: Mar. 2, 2020.

Herz, G., Reichelt, E., Jahn, M., Design and evaluation of a Fischer-Tropsch process for the production of waxes from biogas, Energy, 2017, 132:370-381.

M. Himmel, T. Vinzant, S. Bower, and J. Jechura, BSCL Use Plan: Solving Biomass Recalcitrance Technical Report, NREL/TP-510-37902 Aug. 2005.

Hoek, A., Kersten, L., The Shell Middle Distillate Synthesis Process: Technology, products and perspective; vol. 147, 2004, p. 25-30.

Hohn, K., Schmidt, L., Partial oxidation of methane to syngas at high space velocities over rh-coated spheres, Appl Catal A, 2001, 211:53-68.

Hutchenson, K.W., Marca, C.L., Patience, G.S., Laviolette, J.P., Bockrath, R.E., Parametric study of n-butane oxidation in a circulating fluidized bed reactor, Appl Catal A, 2010, 376:91-103.

Infra XLT Technology, Technology, webpage available at URL https://en.infratechnology.com/about/strategy/, accessed: Mar. 5, 2021.

Ismail, O.S., Global Impact of Gas Flaring, Energy and Power Engineering, 2012, 4:290-302.

Jaworski, Z., Pianko-Oprych, P., A comparative thermodynamic study of equilibrium conditions for carbon deposition from catalytic c-h-o reformates, Energies, 2018, 11:1177.

Laviolette, J.P., Patience, G.S., Chaouki, J., Non-premixed fluidized bed combustion of c1-c4 n-alkanes, Fuel, 2011, 90:2850-2857.

Lee, C.J., Han, C., Comparative economic analysis of gas-to-liquid processes for optimal product selection, In: Alfadala, H.E., Reklaitis, G.R., El-Halwagi, M.M., editors, Proceedings of the 1st Annual Gas Processing Symposium; vol. 1 of Advances in Gas Processing, Amsterdam: Elsevier; 2009, 354-361.

Liander, H., The utilisation of natural gases for the ammonia process, Trans Faraday Soc, 1929, 25:462-472.

Lieberman, M.B., The learning curve, technology barriers to entry, and competitive survival in the chemical processing industries, Strategic Management Journal, 1989, 10(5):431-447, doi:10.1002/smj.4250100504.

Lyubovsky, M., Roychoudhury, S., LaPierre, R., Catalytic partial oxidation of methane to syngas at elevated pressures, Catal Letters, 2005, 99:113-117.

Merrow E. M., An analysis of cost improvements in chemical process technologies, The Rand Corporation, May 1989, URL: https://www.rand.org/content/dam/rand/pubs/reports/2006/R3357.pdf; accessed Mar. 3, 2021.

Mohajerani, S., Kumar, A., Oni, A.O., A techno-economic assessment of gas-to-liquid and coal-to-liquid plants through the development of scale factors, Energy, 2018, 150:681-693.

Ostbye Pedersen, E., Blekkan, E., Noble metal promoted CoMn catalysts for Fischer-Tropsch synthesis, Catal Letters, 2018, 148:1027-1034.

Ott, J., Gronemann, V., Pontzen, F., Fiedler, E., Grossmann, G., Kersebohm, D.B., et al., Methanol, Wiley, 2012, doi: 10.1002/14356007.a16_465.pub3.

Padovani, C., Francetti Giorn, P., Incomplete oxidation of methane with oxygen and air, Giorn Chim Ind Applicata, 1929, 15:429-432, 33.

Patience, G.S., Bockrath, R.E., Butane oxidation process development in a circulating fluidized bed, Appl Catal A, 2010, 376:4-12.

Pauletto, G., Mendil, M., Libretto, N., Mocellin, P., Miller, J.T., Patience, G.S., Short contact time CH4 partial oxidation over Ni based catalyst at 1.5mpa, Chemical Engineering Journal, 2021, 414:128831, doi:10. 1016/j.cej.2021.128831.

Peters, M.S., Timmerhaus, K.D., West, R.E., Plant design and economics for economical for chemical engineers, 5 ed.; New York: McGraw Hill; 2003.

Prettre, M., Eichner, C., Perrin, M., The catalytic oxidation of methane to carbon monoxide and hydrogen, Trans Faraday Soc, 1946, 42:335-339.

Ramberg, D.J., Chen, Y.H., Paltsev, S., Parsons, J.E., The economic viability of gas-to-liquids technology and the crude oil-natural gas price relationship, Energy Econ, 2017, 63:13-21.

Rostrup-Nielsen, J., Christiansen, L.J., Concepts in Syngas Manufacture, Imperial College Press, 2011.

Sandvik, P., Kathe, M., Wang, W., Kong, F., Fan, L.s., High-Pressure Chemical Looping Reforming Processes: System Analysis for Syngas Generation from Natural Gas and Reducing Tail Gases, Energy Fuels, 2018, 32:10408-10420.

Schulz, H., Short history and present trends of Fischer-Tropsch synthesis, Appl Catal A:, 1999, 186:3-12.

\* cited by examiner

NATURAL GAS REFINING UNIT FOR INTEGRATION AT A BATTERY SITE OF AN OIL PRODUCTION FACILITY

CROSS REFERENCE TO RELATED APPLICATIONS

This application is a National Entry Application of PCT application no PCT/CA2022/050385 filed on Mar. 15, 2022 and published in English under PCT Article 21(2), which itself claims benefit, under 35 U.S.C. § 119(e), of U.S. provisional application Ser. No. 63/161,502, filed on Mar. 16, 2021. All documents above are incorporated herein in their entirety by reference.

FIELD OF THE INVENTION

The present invention relates to a natural gas refining unit for integration at a battery site of an oil production facility and a method for converting natural gas at said battery site into a refined product.

BACKGROUND OF THE INVENTION

Flared and vented gas in remote regions of the world contributed in 2019 to about 1% of the total $CO_2$ emissions. High investment costs to build facilities to treat this gas and labor costs to operate the infrastructure are deterrents.

Gas-To-Liquid (GTL) processes convert light hydrocarbons like natural gas from oil production, landfills, and bio-sources to liquid fuels and chemicals—methanol, diesel, dimethyl ether, and gasoline. Often, the first step produces syngas, a mixture of hydrogen and carbon monoxide, and the most common second step is the polymerization/hydrogenation of CO to high molecular weight hydrocarbons via Fischer-Tropsch synthesis (FT) [1, 2]. To compete with petroleum, GTL products must be cost effective, particularly when the price of oil drops or the price of natural gas rises. In the last thirty years increasing oil price, abundance of stranded natural gas, and stricter regulations on volatile organic compounds, $CH_4$, and $CO_2$ emissions increased the interest in GTL.

FT is profitable when the gas price is greater than 7 $USDGJ^{-1}$ while, at 2.8 $USDGJ^{-1}$, other products like dimethyl ether are economic [3]. These constrains have limited the expansion and application of FT technology to large volume production like Sasol's Oryx plant and Shell's Pearl unit in Qatar [4, 5]. Micro refinery units (MRU) convert natural gas in remote regions have yet to meet economic hurdles but they have been scaled down by Velocys® and Infra® to produce synthetic fuels down to 100 barrel per day [6, 7].

Other companies that are adapting GTL to small scale production are CompactGtl (steam reforming, production of 2500 barrels per day of synthetic crude) [8], Greyrock Technology (50-65 barrels per day) [9]. Even when the investment of a GTL unit, that is 100% efficient, costs 280 000 USD/10 bbl $d^{-1}$ (⅓ of existing cost estimates) with no constraints on $CO_2$ emissions, GTL market penetration is expected to be limited in the United States. Including a carbon tax on $CO_2$ emissions, linked to the syngas production, aggravates the profitability [10]. However, the Environmental Protection Agency was poised to repeal methane emissions restrictions applied during the Obama administration. Plants with an output greater than 20000 $bbld^{-1}$ are profitable at 0.32 $USDL^{-1}$ (~46 USD/bbl) [11].

Alberta Energy Regulator (AER) published directives to minimize venting and flaring of associated gas. The World Bank developed this strategy with the Global Gas Reduction program whose goal is to eliminate all routine flaring by 2030. Together with the AER mandate for lower emissions, they limit flaring during well commissioning to 72 h. These initiatives, together with the Paris agreement on global warming, challenge developed countries, like Germany, to reduce $CO_2$ emissions by 55% by 2030 [12]. As results over the years, oil companies have abandoned 170 000 oil wells in Alberta, Canada, only [13]. In 2019, the annual methane consumption in France and Germany matched the amount of natural gas flared worldwide—1% of the annual world $CO_2$ emission comes from the combustion of associated natural gas at oil sites.

While it is clear that GTL is incapable of displacing oil, converting this wasted natural gas into synthetic fuels remains the most attractive solution. Considering catalytic partial oxidation (CPOX) as an exothermic reaction to produce syngas, as dry and steam reforming are endothermic processes and energy intensive especially in remote location, where the only plausible source of heat comes from burning stranded gas, power generation, production of liquid natural gas, and methanol or dimethyl ether are unable to address the problem. In particular, methanol and DME production when using air as source of oxygen (so with no possibility to recycle the unreacted syngas) have a way lower carbon efficiency compared to FT, as the state-of-the-art conversion per pass is uneconomical for small plants [16].

Techno-economic analysis of small-scale FT-GTL considering air and methane as co-reactants are unavailable in the literature or report capital cost estimates based on correlations rather than detailed process design and manufacturer's quotes [17, 18, 19, 20].

The industry is seeking to convert flared natural gas to valuable liquid synthetic petroleum. In a recent conference, Theo Fleisch from the World Bank Global Gas Flare Initiative, detailed large scale processes and stated that the investment cost for 1 bbl/d of diesel type fuel was 100 000 $. The industry focuses on stand-alone units that requires, heat exchangers, storage, and post-treatment facilities (flare, for example) that introduce cost.

SUMMARY OF THE INVENTION

In accordance with the present invention, there is provided:
1. A natural gas refining unit for converting natural gas into a refined product at a battery site of an oil production facility, the battery site being equipped with one or more of a pipeline delivering an oil-water emulsion from an oil field to the battery site; a treater for separating the oil-water emulsion into crude oil, water, and a gas phase comprising natural gas; a crude oil collection system for collecting the crude oil from the treater; a water collection system for collecting the water from the treater; a flare for burning the gas phase from the treater; a gas burner for heating the treater; and an electrical supply,
    the natural gas refining unit comprising:
        optionally, a first vapor-liquid separator in fluid communication with the pipeline,
        the first vapor-liquid separator being configured to separate the oil-water emulsion from the pipeline into a gas phase comprising natural gas and a liquid phase, and a reactor, or a plurality of reactors connected in series, in fluid communication with the first vapor-liquid separator or, when the first vapor-liquid separator is absent, with the treater,
the reactor or the plurality of reactors being configured to convert the natural gas from the gas phase from the first vapor-liquid separator or, when the first vapor-liquid separator is absent, from the gas phase from the treater into the refined product.

2. A battery site of an oil production facility, the battery site comprising one or more of a pipeline delivering an oil-water emulsion from the field to the battery site; a treater for separating the oil-water emulsion into crude oil, water, and a gas phase comprising natural gas, a crude oil collection system for collecting the crude oil from the treater; a water collection system for collecting the water from the treater; a flare for burning the gas phase from the treater; a gas burner for heating the treater; or an electrical supply,
wherein the batterie site further comprises a natural gas refining unit for converting natural gas into a refined product,
wherein the natural gas refining unit comprises:
optionally, a first vapor-liquid separator in fluid communication with the pipeline and with the treater,
the first vapor-liquid separator being configured to separate the oil-water emulsion from the pipeline into a liquid phase and a gas phase comprising natural gas, and
a reactor, or a plurality of reactors connected in series, in fluid communication with the first vapor-liquid separator or, when the first vapor-liquid separator is absent, with the treater,
the reactor or the plurality of reactors being configured to convert the natural gas from the gas phase from the first vapor-liquid separator or, when the first vapor-liquid separator is absent, from the gas phase from the treater into the refined product.

3. The natural gas refining unit of embodiment 1 or the battery site of embodiment 2, being of a size adapted to produce between about 1 and about 200 barrels of refined product produced per day (bbl d$^{-1}$), preferably between about 3 and about 50 bbl d$^{-1}$, and more preferably between about 5 and about 20 bbl d$^{-1}$.

4. The natural gas refining unit/battery site of any one of embodiments 1 to 3, being configured to be mounted on a trailer.

5. The natural gas refining un unit/battery site it of any one of embodiments 1 to 4, wherein the first vapor-liquid separator is present and configured to feed the gas phase comprising natural gas to the reactor or the plurality of reactors, and the reactor or the plurality of reactors is configured to receive the gas phase comprising natural gas from the first vapor-liquid separator.

6. The natural gas refining unit/battery site of 5, wherein the first vapor-liquid separator is configured to feed the liquid phase to the treater.

7. The natural gas refining unit/battery site of 5 or 6, further comprising a bypass line connecting the pipeline to the treater.

8. The natural gas refining unit/battery site of any one of embodiments 1 to 4, wherein the first vapor-liquid separator is absent, and the reactor or the plurality of reactors is configured to receive the gas phase comprising natural gas from the treater.

9. The natural gas refining unit/battery site of any one of embodiments 1 to 8, wherein the refined product is contained in a liquid/gas mixture.

10. The natural gas refining unit/battery site of embodiment 9, wherein the reactor or the plurality of reactors is configured to feed the liquid/gas mixture to the treater.

11. The natural gas refining unit/battery site of 9 embodiment, further comprising a second vapor-liquid separator in fluid communication with the reactor or the plurality of reactors and configured to separate the liquid/gas mixture into an off gas and at least one liquid phase containing the refined product.

12. The natural gas refining unit/battery site of embodiment 11, wherein the second vapor-liquid separator is configured to release the liquid phase to the treater, thereby heating the treater.

13. The natural gas refining unit/battery site of embodiment 11 or 12, wherein the second vapor-liquid separator is a three-phase separator configured to separate the liquid/gas mixture into the off gas, an aqueous phase, and an oil phase containing the refined product.

14. The natural gas refining unit/battery site of embodiment 13, further comprising a tank for receiving the containing the refined product phase released from the three-phase separator.

15. The natural gas refining unit/battery site of embodiment 13, wherein the three-phase separator is configured to release the containing the refined product phase into the crude oil collection system of the battery site.

16. The natural gas refining unit/battery site of any one of embodiments 13 to 15, wherein the three-phase separator is configured to release the aqueous phase into the water collection system of the battery site.

17. The natural gas refining unit/battery site of any one of embodiments 13 to 16, wherein the second vapor-liquid separator is configured to release the off gas to the gas burner of the battery site.

18. The natural gas refining unit/battery site of any one of embodiments 13 to 16, wherein the second vapor-liquid separator is configured to release the off gas to the flare of the battery site.

19. The natural gas refining unit/battery site of any one of embodiments 1 to 18, further comprising a heat exchange system circulating a heat transfer fluid and configured to cool a portion of the natural gas refining unit.

20. The natural gas refining unit/battery site of embodiment 19, comprising at least one cooling heat exchanger installed in said portion of the natural gas refining unit.

21. The natural gas refining unit/battery site of embodiment 19 or 20, wherein the heat exchange system is further configured to heat the treater.

22. The natural gas refining unit/battery site of embodiment 21, wherein the heat exchange system is configured to discharge the heat transfer fluid in the treater.

23. The natural gas refining unit/battery site of embodiment 21, wherein the heat exchange system further comprises a heating heat exchanger configured to heat the treater, wherein the cooling heat exchanger and the heating heat exchanger are in fluid communication with each other and arranged to send hot heat transfer fluid from the cooling heat exchanger to the heating heat exchanger.

24. The natural gas refining unit/battery site of embodiment 23, wherein the cooling heat exchanger and the heating heat exchanger are further configured to return cool heat transfer fluid from the cooling heat exchanger to the heating heat exchanger.

25. The natural gas refining unit/battery site of embodiment 24, wherein the heat exchange system is configured to discharge cool heat transfer fluid to the water collection system of the battery site.
26. The natural gas refining unit/battery site of any one of embodiments 19 to 25, wherein the heat transfer fluid is water.
27. The natural gas refining unit/battery site of embodiment 26, wherein the heat exchange system is configured to use water from the water collection system of the battery unit as the heat transfer liquid.
28. The natural gas refining unit/battery site of embodiment 26, wherein the heat exchange system is configured to use water from the treater as the heat transfer liquid.
29. The natural gas refining unit/battery site of embodiment 26, wherein the heat exchange system is configured to use the aqueous phase the three-phase separator as the heat transfer liquid.
30. The natural gas refining unit/battery site of any one of embodiments 1 to 29, being connected to the electrical supply of the battery site.
31. The natural gas refining unit/battery site of any one of embodiments 1 to 30, wherein the reactor or the plurality of reactors is:
   an oxidative coupling reactor
   a direct methane conversion reactor, or.
   preferably a methane reformer connected in series with another reactor, preferably a Fischer-Tropsch (FT) reactor.
32. The natural gas refining unit/battery site of embodiment 31, wherein the reactor or the plurality of reactors is an oxidative coupling reactor.
33. The natural gas refining unit/battery site of embodiment 31, wherein the reactor or the plurality of reactors is a direct methane conversion reactor.
34. The natural gas refining unit/battery site of embodiment 31, wherein the reactor or the plurality of reactors is a methane reformer connected in series with said other reactor.
35. The natural gas refining unit/battery site of embodiment 34, wherein:
   the methane reformer is in fluid communication with the treater, and is configured to convert the natural gas produced by the treater into syngas and
   said other reactor is in fluid communication with the methane reformer and is configured to convert the syngas into a liquid/gas mixture containing the refined product.
36. The natural gas refining unit/battery site of embodiment 34 or 35, wherein the methane reformer is a partial oxidation (POX) reactor.
37. The natural gas refining unit/battery site of embodiment 34 or 35, wherein the methane reformer is a thermal partial oxidation (TPOX) reactor.
38. The natural gas refining unit/battery site of embodiment 34 or 35, wherein the methane reformer is a steam methane reforming (SMR) reactor.
39. The natural gas refining unit/battery site of embodiment 34 or 35, wherein the methane reformer is an autothermal reforming (ATR) reactor.
40. The natural gas refining unit/battery site of embodiment 34 or 35, wherein the methane reformer is a catalytic partial oxidation (CPOX) reactor.
41. The natural gas refining unit/battery site of embodiment 40, wherein the CPOX reactor is configured to be fed by compressed air and compressed natural gas.
42. The natural gas refining unit/battery site of embodiment 40 or 41, further comprising one or more compressors.
43. The natural gas refining unit/battery site of embodiment 42, comprising an air compressor in fluid communication with the CPOX reactor and configured to feed compressed air to the CPOX reactor.
44. The natural gas refining unit/battery site of embodiment 43, wherein the compressed air is at a pressure from about 10 bar to about 40 bar, preferably from about 15 bar to about 25 bar.
45. The natural gas refining unit/battery site of any one of embodiments 42 to 44, comprising a natural gas compressor in fluid communication with the treater and the CPOX reactor and configured to compress natural gas from the heater and feed compressed natural gas to the CPOX reactor.
46. The natural gas refining unit/battery site of embodiment 45, wherein the compressed natural gas is at a pressure from about 10 bar to about 40 bar, preferably from about 15 bar to about 25 bar.
47. The natural gas refining unit/battery site of embodiment 42, comprising a syngas compressor in fluid communication with the CPOX reactor and said other reactor and configured to compress syngas from the CPOX reactor and feed compressed syngas to said other reactor.
48. The natural gas refining unit/battery site of embodiment 47, wherein the compressed syngas is at a pressure from about 10 bar to about 40 bar, preferably from about 15 bar to about 25 bar.
49. The natural gas refining unit/battery site of any one of embodiments 30 to 48, further comprising a heater for heating the CPOX reactor.
50. The natural gas refining unit/battery site of any one of embodiments 34 to 49, wherein said other reactor, that is connected in series with the methane reformer, is a FT reactor.
51. The natural gas refining unit/battery site of any one of embodiments 1 to 50, further comprising one or more additional reactor to further refine the refined product.
52. A method for converting natural gas into a refined product at a battery site of an oil production facility, the battery site being equipped with one or more of (preferably all of) a pipeline delivering an oil-water emulsion from an oil field to the battery site; a treater for separating the oil-water emulsion into crude oil, water, and a gas phase comprising natural gas; a crude oil collection system for collecting the crude oil from the treater; a water collection system for collecting the water from the treater; a flare for burning the gas phase from the treater; a gas burner for heating the treater; and an electrical supply,
   the method comprising the steps of:
   a) collecting the natural gas at the battery site,
   b) feeding the natural gas to a natural gas refining unit comprising a reactor, or a plurality of reactors connected in series, the reactor or the plurality of reactors being configured to convert the natural gas into the refined product, thereby producing the refined product, and
   c) collecting the refined product.

53. The method of embodiment 52, wherein the natural gas refining unit is as defined in any one of embodiments 1 to 50.
54. The method of embodiment 52 or 53, wherein step a) comprises
   feeding the oil-water emulsion to a first vapor-liquid separator, thereby separating a gas phase containing natural gas from the oil-water emulsion,
   and collecting the gas phase containing natural gas.
55. The method of embodiment 52 or 53, wherein step a) comprises collecting the gas phase containing natural gas from the treater.
56. The method of any one of embodiments 52 to 55, wherein between about 1 and about 200 barrels of refined product produced per day (bbl d$^{-1}$), preferably between about 3 and about 50 bbl d$^{-1}$, and more preferably between about 5 and about 20 bbl d$^{-1}$ are produced.
57. The method of any one of embodiments 52 to 56, wherein the refined product is contained in a liquid/gas mixture, and wherein the method further comprises step d) of feeding the liquid/gas mixture to the treater.
58. The method of any one of embodiments 52 to 56, wherein the refined product is contained in a liquid/gas mixture, and wherein the method further comprises step d') of feeding the liquid/gas mixture to a second vapor-liquid separator to separate the liquid/gas mixtures into its constituent an off gas and a liquid phase containing the refined product.
59. The method of embodiment 58, further comprising the step e) of releasing the liquid phase containing the refined product to the treater, thereby heating the treater.
60. The method of embodiment 58 or 59, wherein the second vapor-liquid separator is a three-phase separator and, in step d'), the liquid/gas mixture is separated into an off gas, an aqueous phase, and an oil phase containing the refined product.
61. The method of embodiment 60, further comprising the step e') of releasing the oil phase containing the refined product to a tank.
62. The method of embodiment 60, further comprising the step e") of releasing the oil phase containing the refined product to the crude oil collection system of the battery site.
63. The method of any one of embodiments 60 to 62, further comprising the step f) of releasing the aqueous phase into the water collection system of the battery site.
64. The method of any one of embodiments 60 to 63, further comprising the step g) of releasing the off gas to the gas burner of the battery site.
65. The method of any one of embodiments 60 to 63, further comprising the step g') of releasing the off gas to the flare of the battery site.
66. The method of any one of embodiments 52 to 65, further comprising the step h) of cooling a portion of the natural gas refining unit using a heat exchange system circulating a heat transfer fluid and configured to cool a portion of the natural gas refining unit.
67. The method of embodiment 66, wherein the heat exchange system comprises at least one cooling heat exchanger installed in said portion of the natural gas refining unit.
68. The method of embodiment 66 or 67, further comprising the step i) of heating the treater using the heat exchange system.
69. The method of embodiment 68, wherein the step i) comprises discharging hot heat transfer fluid from the cooling heat exchanger in the treater.
70. The method of embodiment 68, wherein the step i) comprises heating a heat exchanger configured to heat the treater using hot heat transfer fluid from the cooling heat exchanger.
71. The method of embodiment 70, further comprising the step j) of returning cool heat transfer fluid to the cooling heat exchanger.
72. The method of embodiment 70, further comprising the step j') of discharging cool heat transfer fluid to the water collection system of the battery site.
73. The method of any one or embodiments 66 to 72, wherein the heat transfer fluid is water.
74. The method of embodiment 73, wherein the water is collected from the water collection system of the battery unit and used as the heat transfer liquid.
75. The method of embodiment 73, wherein the water is collected from the treater unit and used as the heat transfer liquid.
76. The method of embodiment 73, wherein the aqueous phase from the three-phase separator is used as the heat transfer liquid.
77. The method of any one of embodiments 52 to 76, further comprising the step k) using the electrical supply of the battery site to supply power to the natural gas refining unit.
78. The method of any one of embodiments 52 to 77, wherein the natural gas refining unit comprises a CPOX reactor connected in series with a FT reactor.
79. The method of embodiment 78, wherein at step b), the CPOX reactor is fed compressed air and compressed natural gas.
80. The method of embodiment 79, wherein the compressed air is at a pressure from about 10 bar to about 40 bar, preferably from about 15 bar to about 25 bar.
81. The method of embodiment 79 and 80, wherein the compressed natural gas is at a pressure from about 10 bar to about 40 bar, preferably from about 15 bar to about 25 bar.
82. The method of embodiment 78, wherein at step b), the FT reactor is fed compressed air syngas.
83. The method of embodiment 82, wherein the compressed syngas is at a pressure from about 10 bar to about 40 bar, preferably from about 15 bar to about 25 bar.
84. The method of any one of embodiments 78 to 83, further comprising, before step a) or step b), a step of heating the CPOX reactor to a desired temperature, preferably in the range of about 873 K to about 1273 K.
85. The method of embodiment 85, further comprising at step b, adjusting the air to natural gas ratio of the air and natural gas fed to the CPOX reactor to reach an acceptable conversion level at said desired temperature.
86. The method of any one of embodiments 78 to 85, further comprising, during step b), the step of cooling syngas as it moves from the CPOX reactor to FT reactor.
87. The method of embodiment 86, wherein the syngas is cooled by the cooling heat exchanger to a temperature of about 473 K to about 550 K.
88. The method of any one of embodiments 78 to 87, further comprising, during step b), sequentially cleaning one or more filters installed at corresponding one or more outlets of the FT reactor.

DETAILED DESCRIPTION OF THE INVENTION

Figure 1:
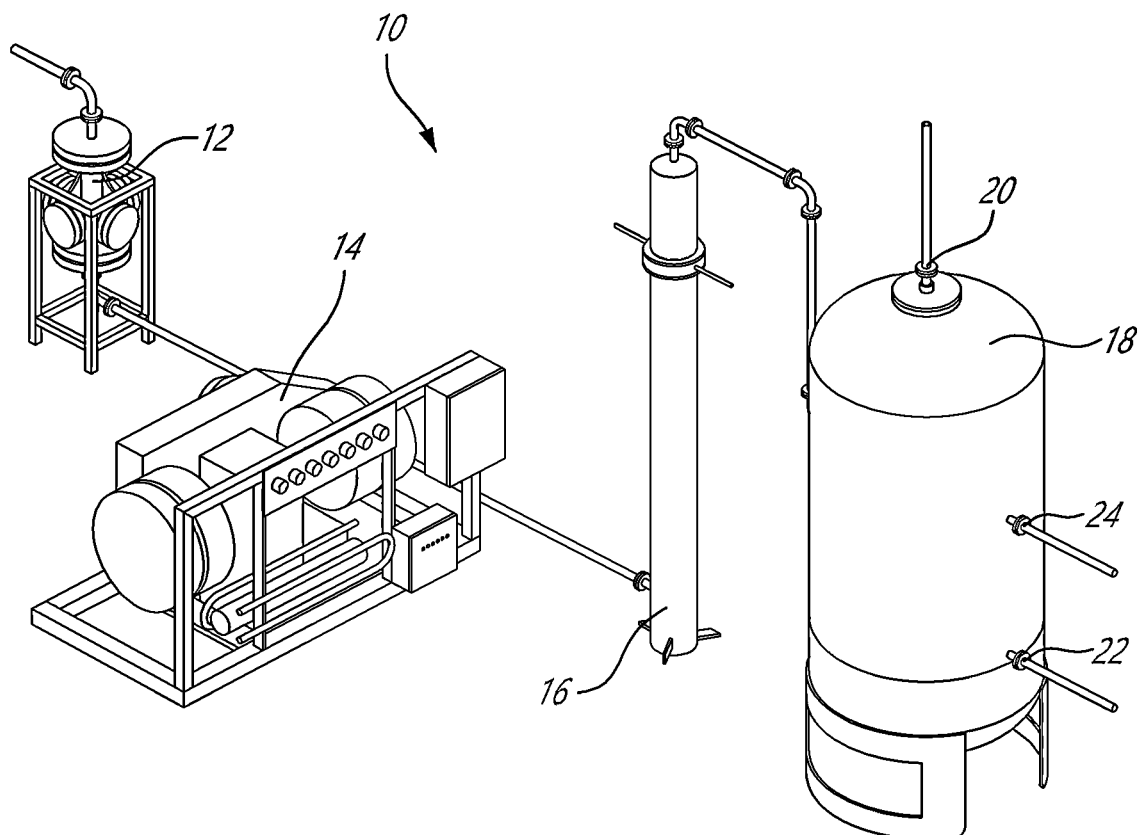
FIG. 1 Low pressure CPOX configuration. From left: CPOX reactor, syngas compressor, FT reactor and three phase separator.

Turning now to the invention in more detail, there is provided a natural gas refining unit for converting natural gas at a battery site of an oil production facility into a refined product, the battery site being equipped with one or more of (preferably all of) a pipeline delivering an oil-water emulsion from an oil field to the battery site; a treater for separating the oil-water emulsion into crude oil, water, and a gas phase comprising natural gas, the treater preferably having an inlet, an oil outlet, a gas outlet and a water outlet; a crude oil collection system for collecting the crude oil from the treater; a water collection system for collecting the water from the treater; a flare for burning the gas phase from the treater; a gas burner for heating the treater; or an electrical supply.

There is also provided such a battery site equipped with a natural gas refining unit for converting natural gas.

As explained in more details below, the integration of the natural gas refining unit directly into a battery site of an oil production as provided by the invention has several advantages.

As is well-known to the skilled person, oil production facilities typically include multiple wells with pump jacks that draw a mixture of petroleum, water, and gas (mainly natural gas) from the underground oil reservoir and send this oil-water emulsion to a battery site. At the battery side, crude oil is separated from the oil-water emulsion by a treater and collected until transport e.g. toward refineries.

Herein, "crude oil" refers to a mixture of unrefined liquid hydrocarbons extracted from natural reservoirs. "Liquid" means that the hydrocarbon(s) are liquid in atmospheric conditions. In some cases, the crude oil can comprise small amounts of nonhydrocarbons originating from the natural reservoirs, such as sulfur and various metals.

Herein, as well as in the art, the term "battery site" refers to a portion of land that contains separators, treaters, dehydrators, storage tanks, pumps, compressors, and other surface equipment in which fluids (the above "oil-water emulsion", which is often foamy because it contains gas) coming from one or more wells are separated to isolate the crude oil therefrom, and also typically measured, and stored until transport, e.g. to an oil refinery. In some cases, a battery site is at each oil well and will be located relatively close to that well. In other cases, a battery site serves more than one well. In such cases, these wells are generally close together and produce similar amounts and types of fluids. The different vessels and equipment that make up the tank battery will be chosen to store and treat the products from those type of wells. For example, wells in one area may be using hydraulic lift while wells in another use gas lift to up production. A battery will need to be equipped to handle the different requirements in each case. Also, the well(s) is(are) often several kilometers from their battery site, but the battery is itself even further away from the oil refineries. Installation cost to lay pipe depends on the terrain but start at 100 000 USD $km^{-1}$ $in^{-1}$ diameter. The investment in pipelines feeding a battery site is thus several millions USD.

Herein, as well as in the art, the term "treater" refers a vessel used to treat the oil-water emulsion from the well(s) so the crude oil can be accepted by the pipeline or transport. Treaters found at battery sites separate a gas phase (comprising mainly natural gas) from a liquid phase (comprising at least crude oil and water typically in the form of an oil-water emulsion) and break this emulsion into water (i.e. an aqueous phase) and crude oil (i.e. an oil phase). To do so, a treater can use several mechanisms. These include heat, gravity segregation, chemical additives, and/or an electric current to break the emulsion. Breaking the emulsion thus typically requires chemical additives, heat, and time. Treaters are typically large (often up to 8 m in diameter and at least as tall) to afford sufficient residence time for a de-emulsifier to work. Typically, natural gas burners heat the fluids in the treater to about 60° C. When treating water-oil emulsions from sour wells, water from the treater is often treated with clarifiers and bactericides to kill sulfur-reducing bacteria that produce $H_2S$, which eventually reacts with iron in pumps to form FeS. The natural gas from the treater is conventionally flared. The water is collected and eventually pumped back down-hole through one of the wells to maintain the oil-field pressure. Treaters therefore commonly have an oil-water emulsion inlet, a crude oil outlet, a gas outlet and a water outlet.

Conventional battery sites typically include, in addition to treater(s) and the other units described above:
- a crude oil collection system to collect the crude oil from the treater(s). This can be a pipeline for transporting the crude oil e.g. towards refinery or a crude oil tank where the crude oil is stored until transport to a refinery;
- a water collection system to collect the water from the treater(s). This can be a reservoir and/or pipes to transport the water back to the well(s);
- a flare to burn the natural gas from the treater;
- a gas burner to heat the treater, and
- an electrical supply.

The natural gas refining unit of the invention is for converting natural gas at a battery site of an oil production facility into liquid fuel. Hence, the natural gas refining unit is configured to be integrated at an already existing battery site or installed during the construction of a battery site.

One of the ways the natural gas refining unit is configured for such integration relate to its size or its capacity in terms of barrels of refined product produced per day (bbl d$^{-1}$). In embodiments, the reactor or the plurality of reactors is of a size adapted to produce between about 1 and about 200 bbl d$^{-1}$, preferably between about 3 and about 50 bbl d$^{-1}$, and more preferably between about 5 and about 20 bbl d$^{-1}$.

Such small size (for the petrochemical industry) means that the natural gas refining unit of the invention is much more mobile than other units with similar purposes in other contexts. Therefore, in embodiments, the natural gas refining unit is configured to be mounted on a trailer. This has the advantage of the rendering it mobile and reducing transportation costs.

The integration of the natural gas refining unit of the invention significantly reduces capital expenditures and equipment by taking advantage of the existing infrastructure: e.g. electricity, flare, vessels and tanks, etc. Compared to conventional systems, the natural gas refining unit of the invention is economical to build, to rent if desired, and to operate in addition to producing valuable refined products. In fact, we estimate a gross margin of 200 000 CAD per unit—see Example 1 below. Not only does the integration of the invention in battery sites reduces capital costs (CAPEX) by a factor of 5, it also eliminates the need for personnel (OPEX) to operate it because the field operators at the battery will be capable of monitoring the unit. Investment drops from 100 000 $/bbl for conventional options to less than 30 000 $/bbl, which is yet to be achieved with any on-going process.

At the moment, the above is particularly advantageous for orphan wells and remote oil batteries, since no other solution is available. Different mobile gas-to-liquids (GTL) units may be available but are not economical or do not offer the same integration with battery units as the present invention.

Finally, the natural gas refining unit of the invention reduces CO$_2$ emissions and flaring at battery site since the natural gas that would be flared is diverted to the natural gas refining unit or used to heat the crude oil in the treater to about 60 C.

The Natural Gas Refining Unit

The natural gas refining unit comprises:
optionally, a first vapor-liquid separator in fluid communication with the pipeline and with the treater,
the first vapor-liquid separator being configured to separate the oil-water emulsion from the pipeline into a liquid phase and a gas phase comprising natural gas, and
a reactor, or a plurality of reactors connected in series, in fluid communication with the first vapor-liquid separator or, when the first vapor-liquid separator is absent, with the treater,
the reactor or the plurality of reactors being configured to convert the natural gas from the gas phase from the first vapor-liquid separator or, when the first vapor-liquid separator is absent, from the gas phase from the treater into the refined product.

In preferred embodiments, the first vapor-liquid separator has an inlet for receiving the oil-water emulsion, a gas outlet for releasing the gas phase, and a liquid outlet for releasing the liquid phase mixture to the treater.

In preferred embodiments, the reactor or the plurality of reactors has an inlet for receiving the gas phase from the first vapor-liquid separator or, when the first vapor-liquid separator is absent, from the gas phase from the treater and an outlet for releasing the refined product.

Herein, a "refining unit" is a production unit for refining or converting raw materials (in the present case natural gas) into products having a greater value than the raw materials (i.e. a refined products).

Herein, reactors connected in series are reactors connected one after each other along a single flow path. The flow path is the path taken through the reactors by the reactant (natural gas), any intermediate in which the natural gas is transformed, and the refined product in which the natural gas is ultimately transformed.

The specific reactor or plurality of reactors used in the natural gas refining unit of the invention will depend on the desired refined products. Non-limiting examples of refined products include: fuel hydrocarbons (paraffins, condensates, gasoline, diesel, waxes, oils), diesel fuel, oxidized hydrocarbons (such as methanol, formaldehyde, dimethyl ether (DME)), and olefins (such as ethylene, propylene and higher olefins).

The motivation for producing refined products is that they are, for the most part, more readily transported than natural gas. Natural gas must be cooled below its critical temperature of −82.3° C. in order to be liquified under pressure. Also, because of the associated cryogenic apparatus, liquefied natural gas (LNG) tankers are used for transport. Furthermore, the energy density of natural gas is half that of gasoline, further motivating the refining of natural gas.

Therefore, in embodiments, the reactor or the plurality of reactors in the natural gas refining unit of the invention is:
an oxidative coupling reactor (produces ethylene from natural gas),
a direct methane conversion reactor (produces methanol, formaldehyde and ethanol from natural gas), or
preferably a methane reformer, either exothermic, endothermic, or the combination of the two (produces syngas from natural gas) connected in series with another reactor, preferably a Fischer-Tropsch (FT) reactor (produces liquid hydrocarbons from syngas).

Optionally, in embodiments, the natural gas refining unit further comprises one or more additional reactor to further refine these products. For example, methanol and ethylene can be converted to gasoline; methanol can be condensed to produce DME; or hydrocarbons may be steam reformed to produce aromatics and hydrogen.

The refined product exiting the reactor or the plurality of reactors may be mixed with other products, including gas (e.g. remaining H$_2$, CO, CO$_2$, CH$_4$), by-products (often water), which means that, often, a liquid/gas mixture containing the refined product exits the reactor or the plurality of reactors. When the refined product is a liquid fuel, the liquid/gas mixture has often three phases: the gas phase, the aqueous phase, and the oil phase containing the refined product.

In preferred embodiments, the reactor or the plurality of reactors is a methane reformer connected in series with a FT reactor. Preferably, in such embodiments, the natural gas refining unit comprises:
a methane reformer in fluid communication with the treater, and configured to convert the natural gas produced by the treater into syngas (which is a mixture of carbon monoxide and hydrogen), and
a FT reactor in fluid communication with the methane reformer and configured to convert the syngas into a liquid/gas mixture containing the refined product.

In preferred embodiments, the methane reformer having an inlet for receiving the natural gas and an outlet for releasing syngas.

In preferred embodiments, the FT reactor having an inlet coupled to the outlet of the methane reformer for receiving the syngas and an outlet for releasing the liquid/gas mixture.

In such embodiments, the liquid/gas mixture typically comprise one or more of condensate, gasoline, diesel, wax, oil (collectively referred as the oil phase containing the refined product herein), water (by product of the FT reaction), and some gases such as CO, $H_2$, and $CO_2$. Fischer-Tropsch synthesis is an exothermic reaction.

Integration to the Battery Site

There are two configurations in which the natural gas refining unit of the invention can be integrated at an already existing battery site: with or without a first vapor-liquid separator upstream from the treater.

Vapor-liquid separators are well-known to the skilled person. They are devices used in e.g. industrial applications to separate a liquid/gas mixtures into the constituent gas and liquid phases. In vapor-liquid separators, gravity is used to cause the denser fluids (liquids) to settle to the bottom of the vessel where it is withdrawn, less dense fluids (gases) are withdrawn from the top of the vessel. A vapor-liquid separator may also be referred to as a flash drum, breakpot, knock-out drum or knock-out pot, compressor suction drum, suction scrubber or compressor inlet drum, or vent scrubber.

In preferred embodiments, the first vapor-liquid separator is present. In such embodiments, the oil-water emulsion [arriving by pipeline from the oil well(s)] is separated into a gas phase comprising natural gas and into a liquid phase by the first vapor-liquid separator.

This liquid phase is simply what remains of the oil-water emulsion after its gaseous components have been removed. Therefore, this liquid is typically still in the form of an oil-water emulsion. This liquid phase is thus typically directed toward the treater to be separated into crude oil and water. Thus, in embodiments, the first vapor-liquid separator is configured to feed the liquid phase to the treater. In preferred embodiments, the liquid outlet of the first vapor-liquid separator is adapted to be coupled with the inlet of the treater, so as to establish a fluid communication between the liquid outlet of the first vapor-liquid separator and the inlet of the treater.

The gas phase is directed to the reactor or the plurality of reactors. Thus, in embodiments, the first vapor-liquid separator is configured to feed the gas phase to the reactor or the plurality of reactors. Therefore, the reactor or the plurality of reactors is configured to receive the gas phase comprising natural gas from the first vapor-liquid separator. Hence, the reactor or the plurality of reactors is in fluid communication with the first vapor-liquid separator and is configured to convert the natural gas from the gas phase from first vapor-liquid separator into the refined product.

In embodiments, the inlet of the reactor or the plurality of reactors is coupled with the gas outlet of the first vapor-liquid separator, so as to establish a fluid communication between the inlet of the reactor or the plurality of reactors and the gas outlet of the first vapor-liquid separator.

In embodiments, the natural gas refining unit further comprises a bypass line connecting the pipeline to the treater. This line acts as a bypass line so the oil-water emulsion can bypass the first vapor-liquid separator and the reactor and the plurality of reactors. This bypass line is useful when the natural gas refining units is shut down, for example for maintenance. This bypass line enables better troubleshooting and maintenance while ensuring continuous operation of the battery site.

In alternative embodiments, the first vapor-liquid separator is absent. In such embodiments, the oil-water emulsion [arriving by pipeline from the oil well(s)] is separated into crude oil, water, and a gas phase comprising natural gas by the treater. The water and the crude oil are directed to and the water collection system and the crude oil collection system of the battery site as usual in conventional battery site.

The gas phase is directed to the reactor or the plurality of reactors. Hence, the reactor or the plurality of reactors is configured to receive the gas phase comprising natural gas from the treater. In preferred embodiments, the reactor or the plurality of reactors is in fluid communication with the treater and configured to convert the natural gas from the gas phase from the treater into the refined product.

In preferred embodiments, the inlet of the reactor or the plurality of reactors is adapted to be coupled with the gas outlet of the treater, so as to establish a fluid communication between the inlet of the reactor or the plurality of reactors and the outlet of the treater.

The refined product exiting the reactor or the plurality of reactors (preferably the FT reactor) may be mixed with other products, including various gases (e.g. remaining $H_2$, CO, $CH_4$), by-products (often water), which means that, often, a liquid/gas mixture containing the refined product exits the reactor or the plurality of reactors. This liquid/gas mixture has often three phases: a gas phase, an aqueous phase, and an oil phase containing the refined product.

In embodiments in which the refined product is contained in a liquid/gas mixture, the reactor or the plurality of reactors (preferably the FT reactor) can be configured to feed the liquid/gas mixture to the treater. This has the advantage of heating the treater and obviating the need for a separate piece of equipment to separate the liquid/gas mixture (since the treater will perform this separation). Such embodiments are particularly preferred when the first vapor-liquid separator is present. In such embodiments, the gas phase separated by the treater is sent to the flare of the battery site, as usual in conventional battery sites. The water separated by the treater can be sent to the water collection system of the battery site, as usual in conventional battery sites. The crude oil separated by the treater can be sent to the crude oil collection system of the battery site, as usual in conventional battery sites. It is an advantage of these embodiments that the integration of the natural gas refining unit of the invention to the battery does not necessitate any change in the design of the treater (compared to conventional battery sites). In preferred such embodiments, the outlet of the reactor or the plurality of reactors (preferably of the FT reactor) is adapted to be coupled with the oil-water emulsion inlet of the treater or another inlet of the treater so as to establish a fluid communication between this outlet and either inlet.

In alternative embodiments, the natural gas refining unit of the invention further comprises a second vapor-liquid separator in fluid communication with the reactor or the plurality of reactors (preferably the FT reactor) and configured to separate the liquid/gas mixture into an off gas and at least one liquid phase containing the refined product. Such embodiments are particularly preferred when the first vapor-liquid separator is absent. In preferred embodiments, the second vapor-liquid separator has an inlet in fluid communication and coupled with the outlet of the reactor or the plurality of reactors (preferably the FT reactor) for receiving the liquid/gas mixture, a gas outlet for releasing the off gas and at least one liquid outlet for releasing the liquid phase.

In further such embodiments, the second vapor-liquid separator is configured to release the liquid phase to the treater. Indeed, the liquid phase exiting the second vapor-liquid separator is typically at a temperature between about 150° C. and about 350° C. These embodiments therefore have the advantage of heating the treater, where a temperature of about 60° C. is desirable. In preferred such embodiments, the liquid outlet of the second vapor-liquid separator is adapted to be coupled with the oil-water emulsion inlet of the treater or another inlet of the treater so as to establish a fluid communication between the liquid outlet of the second vapor-liquid separator and either inlet.

In more specific embodiments, the second vapor-liquid separator is a three-phase separator configured to separate the liquid/gas mixture into the off gas, an aqueous phase, and an oil phase containing the refined product. In preferred embodiments, the three-phase separator has an inlet in fluid communication and coupled with the outlet of the reactor or the plurality of reactors (preferably the FT reactor) for receiving the liquid/gas mixture gas, a gas outlet for releasing the off gas, a water outlet for releasing the aqueous phase and an oil outlet for releasing the oil phase containing the refined product.

A three-phase separator is a type of vapor-liquid separator operating as a 3-phase separator, with two immiscible liquid phases of different densities. For example, natural gas (vapor), water and oil. The two liquids settle at the bottom of the vessel with oil floating on the water. Separate liquid outlets are provided for each liquid.

The use of a three-phase separator has the advantage of removing water and the off gas from the oil phase containing the refined product so the refined product can be used for various purposes. In embodiments, the natural gas refining unit thus further comprises a tank for receiving the containing the refined product phase released from the three-phase separator. In preferred embodiment, the tank has at inlet in fluid communication and coupled with the oil outlet of the three-phase separator. Such embodiments are particularly desirable when one desire to keep the refined product separate from the crude oil produced by the treater.

In alternative embodiments, the three-phase separator is configured to release the containing the refined product phase into the crude oil collection system of the battery site. Such embodiments are particularly desirable when the refine product is of a similar nature to the crude oil produced by the treater. In preferred such embodiments, the oil outlet of the three-phase separator is in fluid communication and adapted to be coupled with an inlet of the crude oil collection system of so as to establish a fluid communication between the oil outlet of the three-phase separator and the inlet of the oil collection system.

In embodiments, the three-phase separator is configured to release the aqueous phase into the water collection system of the battery site. In preferred such embodiments, the water outlet of the three-phase separator is in fluid communication and adapted to be coupled with an inlet of the water collection system so as to establish a fluid communication between the oil outlet of the three-phase separator and the inlet of the water collection system.

In embodiments, the second vapor-liquid separator is configured to release the off gas to the gas burner of the battery site (i.e. the gas burner for heating the treater). This has the advantage of reducing the among of natural gas burned for that purpose. In preferred such embodiments, the gas outlet of the second vapor-liquid separator is in fluid communication and adapted to be coupled with an inlet of the gas burner so as to establish a fluid communication between the gas outlet of the second vapor-liquid separator and the inlet of the gas burner.

In preferred embodiments, the second vapor-liquid separator is configured to release the off gas to the flare of the battery site. In preferred such embodiments, the gas outlet of the second vapor-liquid separator is in fluid communication and adapted to be coupled with an inlet of the flare so as to establish a fluid communication between the gas outlet of the second vapor-liquid separator and the inlet of the flare.

The natural gas refining unit of the invention can also provide heat to the treater in other ways. This is because any of the reactors can house exothermic reactions and may thus need to be cooled. Therefore, heat can/must be removed to control the reaction(s). In any case, the heat removed from the natural gas refining unit can be used to heat the treater. In fact, the treater is used as a sink to cool the natural gas refining unit as needed. Such embodiments are even more economical since the heat removed can become the primary source of energy for the treater. This reduces $CO_2$ emissions and flaring compared to the conventional burning of natural gas to heat, Thus, in embodiments, the natural gas refining unit further comprises a heat exchange system circulating a heat transfer fluid and configured to cool a portion of the natural gas refining unit. In embodiments, the heat exchange system comprises at least one cooling heat exchanger installed in said portion of the natural gas refining unit, i.e. in a location that can/must be cooled. Such location can be in one of the reactors or in the flow path between two reactors of the plurality of reactors. In preferred embodiments where a methane reformer is connected in series with a FT reaction, this location can be:

in the methane reformer (to cool the methane reformer),
in a syngas flow path between the methane reformer and FT reactor (to cool the syngas),
in the FT reactor (to cool this reactor),
in a liquid/gas mixture flow path after the liquid/gas mixture exits the FT reactor (to cool this mixture).

In preferred embodiments, the heat exchange system is further configured to heat to the treater.

In such embodiments, the heat exchange system can be configured to discharge the heat transfer fluid in the treater. In preferred such embodiments, the heat exchange system has a hot fluid outlet for releasing hot heat transfer fluid adapted to be coupled with the oil-water emulsion inlet of the treater or another inlet of the treater so as to establish a fluid communication between the hot fluid outlet and either inlet.

In alternative embodiments, the heat exchange system further comprises a heating heat exchanger configured to heat the treater, wherein the cooling heat exchanger and the heating heat exchanger are in fluid communication with each other and arranged to send hot heat transfer fluid from the cooling heat exchanger to the heating heat exchanger.

Various types of heat exchangers are well known to the skilled person and can be envisioned in the present invention depending on the exact location of such exchangers. Some of the more common variants of heat exchangers employed throughout industry include:

Shell and tube heat exchangers—constructed of a single tube or series of tubes (i.e., tube bundle) enclosed within a sealed shell. The design of these devices is such that one fluid flows through the smaller tube(s), and the other fluid flows around its/their outside(s) and between it/them within the sealed shell.

Double pipe heat exchangers—a form of shell and tube heat exchanger, double pipe heat exchangers employ the simplest heat exchanger design and configuration which consists of two or more concentric, cylindrical pipes or tubes (one larger tube and one or more smaller tubes).

Plate heat exchangers—also referred to as plate type heat exchangers, plate heat exchangers are constructed of several thin, corrugated plates bundled together. Each pair of plates creates a channel through which one fluid can flow, and the pairs are stacked and attached—via bolting, brazing, or welding—such that a second passage is created between pairs through which the other fluid can flow.

In further embodiments, the cooling heat exchanger and the heating heat exchanger are further configured to return cool heat transfer fluid from the cooling heat exchanger to the heating heat exchanger.

In alternative embodiments, the heat exchange system is configured to discharge cool heat transfer fluid to the water collection system of the battery site. In preferred such embodiments, the heat exchange system has a cool fluid outlet for releasing cool heat transfer fluid adapted to be coupled with an inlet of the water collection system so as to establish a fluid communication between the cool fluid outlet and the inlet of the water collection system.

In embodiments, the heat transfer fluid is water (which will typically turn to steam in the cooling heat exchanger). In such embodiments, the heat exchange system is configured to use water as the heat transfer liquid. In preferred such embodiments, the heat exchange system is configured to use water from the water collection system of the battery unit as the heat transfer liquid. In other embodiments, the heat exchange system is configured to use water from the treater as the heat transfer liquid. In yet other embodiments, the heat exchange system is configured to use the aqueous phase the three-phase separator as the heat transfer liquid.

In preferred such embodiments, the heat exchange system has a water inlet for receiving water adapted to be coupled with an outlet of the water collection system, with the water outlet of the treater, or with the water outlet of the three-phase separator so as to establish a fluid communication between the water inlet of the heat exchange system and any one of these outlets as the case may be.

Typically, the off gas can be a mixture of $C_{1-3}$ products, unreacted syngas, and $N_2$.

In embodiments, the natural gas refining unit is connected to the electrical supply of the battery site.

As can be seen from the above, the natural gas refining unit of the invention can be integrated to a battery site in many different ways simultaneously (it uses natural gas from the battery; off gas from the natural gas refining unit goes to the battery's flare; water from the battery site is used to control the temperature in the natural gas refining unit and then the treater is used as a sink to cool it; and the hot liquid phase from the natural gas refining unit used to heat the treater). This original extensive integration has several advantages:

(1) More hydrocarbon production per unit of time;
(2) Reduced natural gas combustion to heat the treater;
(3) Elimination of equipment (and thus capital) due to integration with existing facilities at the battery site:
 a. oil collection system,
 b. water collection system,
 c. water treatment,
 d. electrical supply (e.g. turbine to generate electricity),
 e. flare,
 f. civil engineering to prepare ground,
 g. external heat transfer medium, and
 h. In some embodiments, three phase or two-phase separator is not needed (i.e. only two phase can be used);
(4) Number up strategy reduces capital costs—these natural gas refining units are much smaller than the 100-1000 barrel a day per natural gas refining unit, and so achieve economies through building hundreds of natural gas refining units; and
(5) Transportation costs are minimal as the equipment can fit in a trailer.

It will be apparent to the skilled person that all the fluid connection and coupling between inlets and outlets discussed herein can be accomplished by known means including pipes, joints, etc.

Reactor or Plurality of Reactors

As noted above, the specific reactor or plurality of reactors used in the natural gas refining unit of the invention will depend on the desired refined products. These reactors have been listed above and are further discussed here.

In embodiments, the reactor is an oxidative coupling reactor.

The oxidative coupling of methane (OCM) is a chemical reaction discovered in the 1980s for the direct conversion of natural gas, primarily consisting of methane, into value-added chemicals. The principal desired product of OCM is ethylene. The oxidative coupling of methane to ethylene is: $2CH_4+O_2 \rightarrow C_2H_4+2H_2O$. The reaction is exothermic and occurs at high temperatures (750-950° C.). In the reaction, methane is activated heterogeneously on a catalyst surface, forming methyl free radicals, which then couple in the gas phase to form ethane, which subsequently undergoes dehydrogenation to form ethylene.

In alternative embodiments, the reactor is a direct methane conversion reactor.

Direct methane conversion is a process recently developed and patented by Gas Technologies LLC and commercialized under the tradename GasTechno®. This process is described in U.S. Pat. Nos. 10,287,224; 9,255,051; and 9,556,092, incorporated herein by reference.

Methane Reformer Connected in Series with Another Reactor

In yet other and preferred embodiments, the reactor or the plurality of reactors is a methane reformer connected in series with another reactor, such as a FT reactor.

A methane reformer is a reactor for housing an oxidation reaction that produces hydrogen gas as well as carbon monoxide (i.e. syngas) from the methane in natural gas. Such oxidation reactions are well known to the skilled person. They include for example:

POX (partial oxidation): a chemical reaction occurring when a substoichiometric fuel-air mixture is partially combusted creating a hydrogen-rich syngas, which can then be put to further use. During POX, natural gas (or a heavy hydrocarbon fuel) is mixed with a limited amount of oxygen in an exothermic process: $C_nH_m + n/2\ O_2 \rightleftharpoons n\ CO + m/2 H_2$. Subtypes of POX include:

TPOX (thermal partial oxidation): POX reaction in which temperatures are dependent on the air-fuel ratio or oxygen-fuel ratio. Typical reaction temperatures are 1200° C. and above.

CPOX (catalytic partial oxidation): POX reaction that uses a catalyst to reduce the required temperature to around 800° C.-900° C.

The choice of between TPOX and CPOX depends on the sulfur content of the fuel being used. CPOX can be employed if the sulfur content is below 50 ppm. A higher sulfur content can poison the catalyst, so the TPOX procedure is used for such fuels. However, recent research shows that CPOX is possible with sulfur contents up to 400 ppm.

POX is typically much faster than steam methane reforming and requires a smaller reactor vessel. POX however produces less hydrogen per unit of the input fuel than steam reforming of the same fuel.

SMR (steam methane reforming): a method for producing syngas by reaction of hydrocarbons with water. Commonly natural gas is the feedstock. The main purpose of this technology is hydrogen production. The reaction is represented by this equilibrium: $CH_4+H_2O \rightleftharpoons CO+ 3H_2$. The reaction is conducted in a reformer vessel where a high-pressure mixture of steam and methane are put into contact with a nickel catalyst. This reaction is mildly exothermic.

ATR (Autothermal reforming) uses oxygen and carbon dioxide or steam in a reaction with methane to form syngas. The reaction is exothermic n. When the ATR uses carbon dioxide, the $H_2$:CO ratio produced is 1:1; when the ATR uses steam the $H_2$:CO ratio produced is 2.5:1. The reactions can be described in the following equations:

using $CO_2$: $2CH_4+O_2+CO_2 \rightarrow 3H_2+3CO+H_2O$ and using steam: $4CH_4+O_2+2H_2O \rightarrow 10H_2+4CO$.

The outlet temperature of the syngas is between 950-1100° C. and outlet pressure can be as high as 100 bar.

The main difference between SMR and ATR is that SMR only uses air for combustion as a heat source to create steam, while ATR uses purified oxygen. The advantage of ATR is that the $H_2$:CO can be varied, which can be useful for producing specialty products. For example, the production of dimethyl ether requires a 1:1 $H_2$:CO ratio.

In embodiments, the methane reformer is a POX reactor.
In embodiments, the methane reformer is a SMR reactor.
In embodiments, the methane reformer is an ATR reactor.

In preferred embodiments, the methane reformer is a CPOX reactor. As noted above, CPOX uses natural gas and air without including oxygen and nitrogen separation. Therefore, it is cheaper and/or safer than ATR. In particular, avoiding using pure $O_2$ is advantageous since doing so poses safety issue because the resulting gas mixture and products fall in their flammability range of composition. Furthermore, another advantage compared to SMR, is that CPOX catalysts are not easily deactivated by sulfur.

In preferred such embodiments, the CPOX reactor has an inlet for receiving the natural gas and a syngas outlet. The other reactor (preferably the FT reactor) connected in series with the CPOX reactor preferably has a syngas inlet and an outlet for releasing the refined product.

In preferred embodiments, the CPOX reactor is configured to be fed by compressed air and compressed natural gas. Therefore, in embodiments, the natural gas refining unit of the invention further comprises one or more compressors.

In embodiments, the natural gas refining unit of the invention comprises an air compressor. In embodiments, the compressor has an air inlet and a compressed air outlet. In embodiments, the air compressor is in fluid communication with the CPOX reactor and is configured to feed compressed air to the CPOX reactor. The air to be compressed can, of course, be taken in by directly from the environment around the air inlet of the compressor. In preferred such embodiments, the compressed air outlet of the air compressor is coupled with either the inlet for receiving the natural gas of the CPOX reactor or with a separate air inlet of the CPOX reactor, so as to establish a fluid communication between the compressed air outlet of the air compressor and either of the above inlet of the CPOX reactor. In embodiments, the compressed air is at a pressure from about 10 bar to about 40 bar, preferably from about 15 bar to about 15 bar.

In further embodiments, the natural gas refining unit of the invention comprises a natural gas compressor. In embodiments, the compressor having a natural gas inlet and a compressed natural gas outlet. In embodiments, the natural gas compressor is in fluid communication with the treater and the CPOX reactor and is configured to compress natural gas from the heater and feed compressed natural gas to the CPOX reactor. In preferred such embodiments, the natural gas inlet of the natural gas compressor is adapted to be coupled with the gas outlet of the treater, so as to establish a fluid communication between the gas outlet of the treater and the natural gas inlet of the natural gas compressor. In preferred such embodiments, the compressed natural gas outlet of the natural gas compressor is coupled with the inlet for receiving the natural gas of the CPOX reactor, so as to establish a fluid communication between the compressed natural gas outlet of the natural gas compressor and the inlet for receiving the natural gas of the CPOX reactor. In embodiments, the compressed natural gas is at a pressure from about 10 bar to about 40 bar, preferably from about 15 bar to about 25 bar.

In alternative embodiments, the syngas produced by the CPOX reactor is compressed before being fed to the other reactor (preferably the FT reactor) connected in series with the CPOX reactor.

Therefore, in embodiments, the natural gas refining unit of the invention further comprises a syngas compressor. In embodiments, the syngas compressor has a syngas inlet and a compressed syngas outlet. In embodiments, the syngas compressor is in fluid communication with the CPOX reactor and said other reactor and is configured to compress syngas from the CPOX reactor and feed compressed syngas to said other reactor. In preferred such embodiments, the syngas inlet of the syngas compressor is coupled with the syngas outlet of the CPOX reactor, so as to establish a fluid communication between the syngas outlet of the CPOX reactor and the syngas inlet of the syngas compressor.

In preferred such embodiments, the compressed syngas outlet of the syngas compressor is coupled with the syngas inlet of said other reactor, so as to establish a fluid communication between the compressed syngas outlet of the natural gas compressor and the syngas inlet of said other reactor. In embodiments, the compressed syngas is at a pressure from about 10 bar to about 40 bar, preferably from about 15 bar to about 25 bar.

Any and of the above compressor(s) can be filter-included reciprocating compressor(s), which can provide e.g. 180 $Lmin^{-1}$ at 3 MPa (max).

When starting the CPOX reactor, in the commissioning step, the CPOX reactor is heated to reach a desired temperature, typically in the range of about 873 K to about 1273 K. This is required for the partial oxidation of natural gas. Therefore, in embodiments, the natural gas refining unit further comprises a heater, for example an electrical heater, by induction, or by resistive heating for heating the CPOX reactor. In embodiments, the heater has two sections with a heating power of about 13.5 kW including its own temperature controller as well as, preferably, temperature limit in case of overheating.

Since the partial oxidation is exothermic and the CPOX reactor is adiabatic, it potentially provides enough energy to keep the reaction going even when the heater is turned off. Based on the nature of reaction, the thermodynamic control parameter of the reaction temperature is the ratio of air to the natural gas. Hence, adjusting this ratio properly to reach an acceptable conversion of feed to syngas leads to about 873 K to about 1273 K in the CPOX reactor.

The product produced in the CPOX reaction mainly consists of syngas. This syngas will be at the above temperatures. In a preferred embodiment, the cooling heat exchanger is located in a syngas flow path between the CPOX reactor and FT reactor. In preferred embodiments, the cooling heat exchanger comprises two double pipe heat exchangers. In embodiments, the syngas is cooled by the cooling heat exchanger to a temperature of about 473 K to about 550 K.

Methane Reformer (Preferably CPOX Reactor) in Series with a Fischer-Tropsch (FT) Reactor As noted above, in embodiments, the methane reformer (preferably the CPOX reactor) is connected in series with a Fischer-Tropsch reactor.

The Fischer-Tropsch process is a collection of chemical reactions that converts syngas into liquid hydrocarbons (including paraffins and olefins). These reactions occur in the presence of metal catalysts, typically at temperatures of about 150° C. to about 300° C. and pressures of one to several tens of atmospheres.

The Fischer-Tropsch process involves multiple chemical reactions that produce a variety of hydrocarbons, ideally having the general formula ($C_nH_{2n+2}$). The more useful reactions produce alkanes as follows: (2n+1) $H_2$+n $CO \rightarrow C_nH_{2n+2}$+n $H_2O$, where n is typically 5-20. Most of the alkanes produced tend to be straight-chain, suitable as diesel fuel. In addition to alkane formation, competing reactions give small amounts of alkenes, alcohols and other oxygenated hydrocarbons as well as olefins.

Reactant gases entering a Fischer-Tropsch reactor must be desulfurized. Otherwise, sulfur-containing impurities deactivate ("poison") the catalysts required for Fischer-Tropsch reactions.

High-Temperature Fischer-Tropsch (or HTFT) is operated at temperatures from about 330° C. to about 350° C. and typically uses an iron-based catalyst. Low-Temperature Fischer-Tropsch (LTFT) is operated at lower temperatures and typically uses an iron- or cobalt-based catalyst. Ruthenium-based catalysts are very active FT catalyst. They work at the lowest reaction temperatures, and it produces the highest molecular weight hydrocarbons. Generally, FT reactors with iron catalyst typically operate at 2.0 MPa and above about 300° C. while those using cobalt catalysts typically operate below about 240° C., but newer formulations operate as high as about 280° C.

In embodiments, the inlet of the FT reactor is equipped with a distributor to feed the syngas in the FT reactor.

In embodiments, the inlet of the FT reactor is located towards the bottom of the reactor.

Typically, the FT reactor is filled with enough catalyst (e.g. about 50 to about 150 kg). During the FT reaction, hydrogen reacts with carbon monoxide at the surface of the catalyst to produce the desired hydrocarbon products as a liquid/gas mixture.

In embodiments, the FT reactor is in fixed bed configuration, in slurry configuration or in fluidized bed configuration, preferably in fluidized bed.

In embodiments, the outlet of the FT reactor is located towards or at the top of the reactor.

In embodiments, the outlet of the FT reactor is equipped with a filter to separate catalyst particles from the liquid/gas mixture. Filters should be cleaned when the pressure in the pressure drop rises to a set-point (20000 Pa, for example).

In preferred embodiments, the FT reactors comprise two or more outlets, each equipped with a filter. In this configuration the filters can be cleaned sequentially by stopping the liquid/gas mixture flow to one of the outlets to cleaning the filter of this outlet, while the flow is maintained (or transferred to) the other outlet. In preferred embodiments, the outlet solenoid valve of one outlet is closed and the air cleaning valve of this filter is opened to clean the filter for a certain time duration (e.g. 2 s). Concurrently, the outlet solenoid valve of the other filter is opened to let the liquid/gas mixture exit the reactor.

FIG. 1 shows a natural gas refining unit (10) according to an embodiment of the invention. This natural gas refining unit comprises a CPOX reactor (12) connected in series to a syngas compressor (14) and then to a FT reactor (16). The FT reactor is connected to a three-phase separator (18) that has three outlet: a gas outlet (20) for releasing the off gas (at the apex of the separator), a water outlet (22) for releasing the aqueous phase (toward the bottom of the separator) and an oil outlet (24) for releasing the oil phase containing the refined product (toward the top of the separator).

Figure 2:
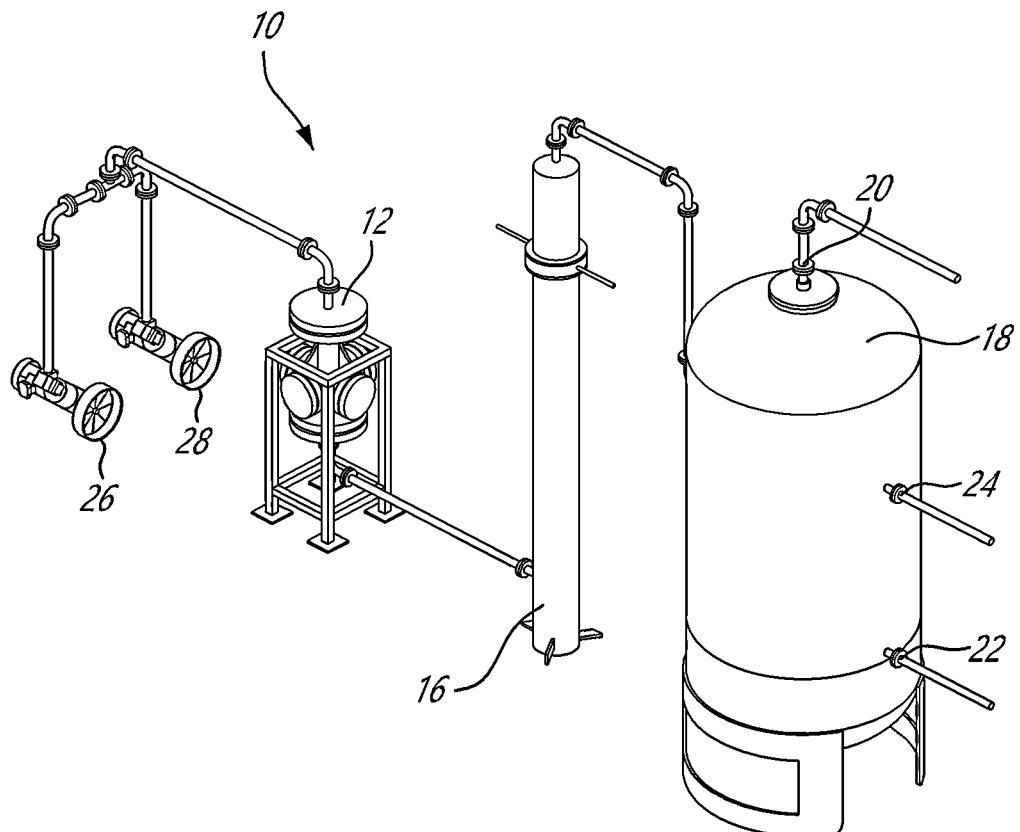
FIG. 2 High pressure CPOX configuration. From left: air and natural gas compressors, CPOX reactor, FT reactor and three phase separator.

FIG. 2 shows a natural gas refining unit (10) according to another embodiment of the invention. This natural gas refining unit comprises an air compressor (26) and a natural gas compressor (28) feeding a CPOX reactor (12) connected in series to a FT reactor (16). The FT reactor is connected to a three-phase separator (18) that has three outlet: a gas outlet (20) for releasing the off gas (at the apex of the separator), a water outlet (22) for releasing the aqueous phase (toward the bottom of the separator) and an oil outlet (24) for releasing the oil phase containing the refined product (toward the top of the separator).

Figure 3:
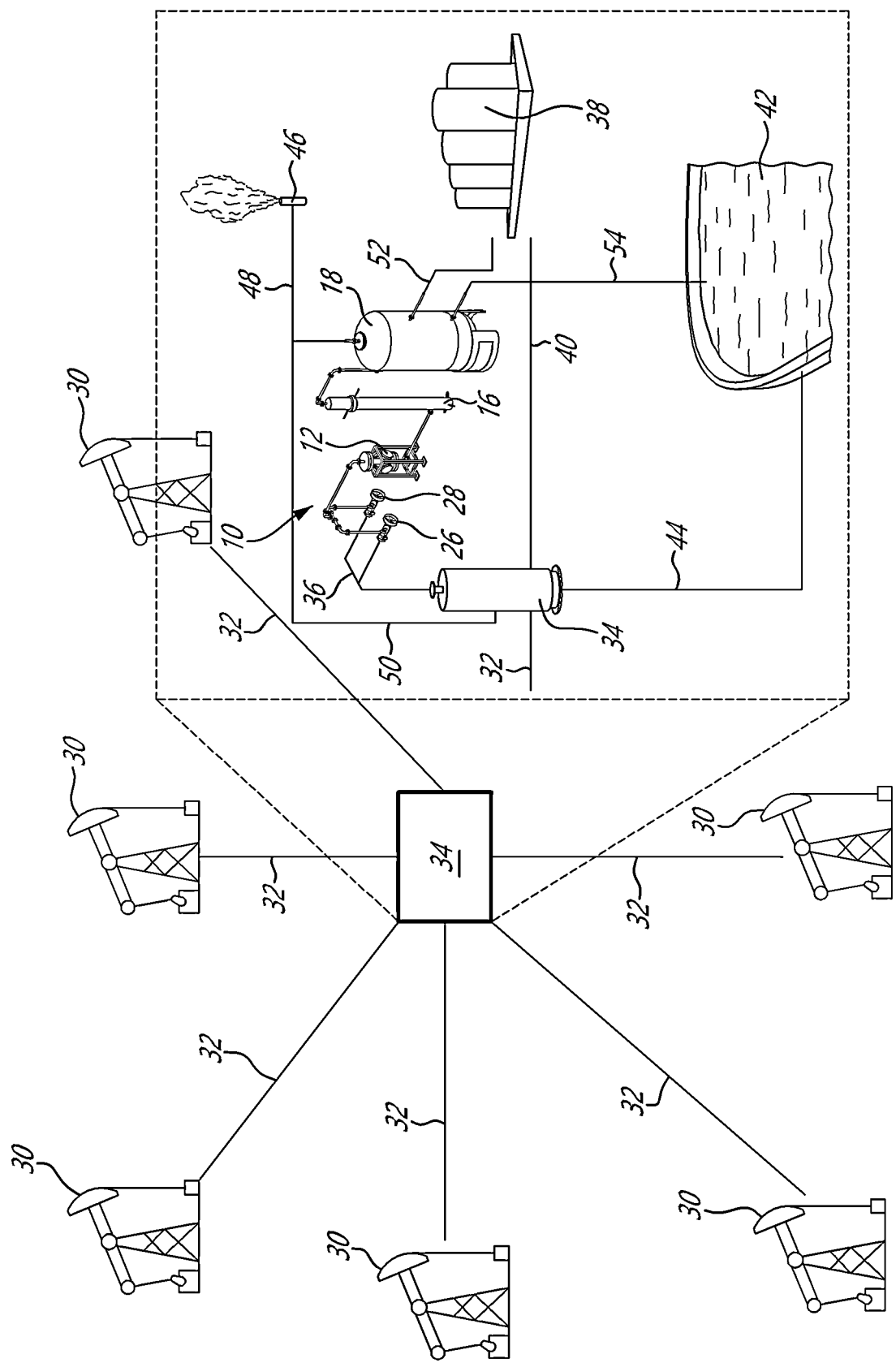
FIG. 3 Overview of the process on an oil field.

FIG. 3 shows an oil field with several oil wells (30), each connected by pipelines (32) to a battery site (34). At the battery site, a treater (34) receives the oil-water emulsion from the oil wells (30). At the battery site (34), a natural gas refining unit (10) according to an embodiment of the invention is installed. The natural gas from the treater (34) is sent to the natural gas refining unit (10) by gas pipe (36). The crude oil from the treater (34) is sent to the oil tanks (38) from the battery site (34) by oil pipe (40). The aqueous phase from the treater (34) is sent to the water reservoir (42) from the battery site by water pipe (44). The natural gas refining unit (10) comprises an air compressor (26) and a natural gas compressor (28) feeding a CPOX reactor (12) connected in series to a FT reactor (16). The FT reactor (16) is connected to a three-phase separator (20). The off gas from the separator (20) is sent to the flare (46) of the battery unit by off gas pipe (48) Optionally, part or all the natural gas from the separator (20) is sent via pipe (50) to the treater (34), where it can be used to heat the treater (34). The oil phase containing the refined product from the separator (20) is sent to the oils tanks (38) from the battery site by oil pipe (52). The aqueous phase from the separator (20) is sent to the water reservoir (42) from the battery site by water pipe (54).

Figure 4:
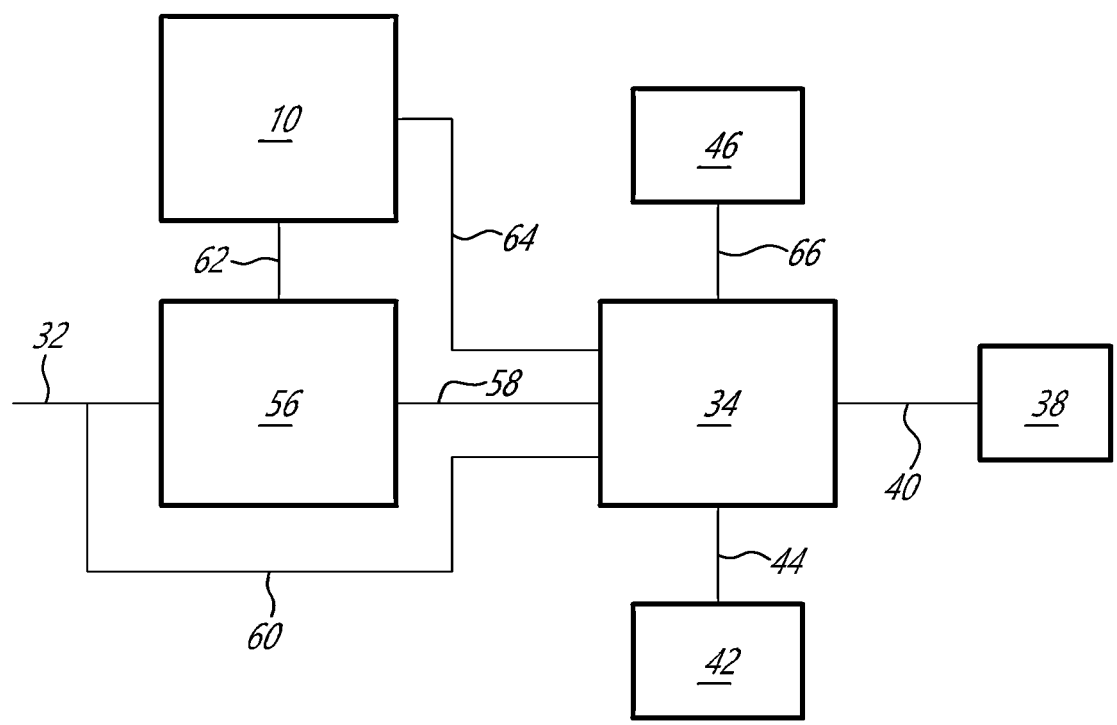
FIG. 4 Scheme of a natural gas refining unit according to an embodiment of the invention integrated to a battery site.

FIG. 4 shows a natural gas refining unit (10) according to an embodiment of the invention integrated at a battery site. The pipeline (32) from the oil well(s) is connected with a (first) vapor-liquid separator (56). The liquid phase from the vapor-liquid separator (56) is sent to the treater (34) by pipe (58). A by-pass line (60) allows the oil-water emulsion from the oil well to bypass the vapor-liquid separator (56) and be directly sent to the treater (34). The gas phase comprising natural gas separated by the vapor-liquid separator (56) is sent through pipe (62) to the natural gas refining unit (10). The refined product produced by natural gas refining unit (10) and contained in a liquid/gas mixture is sent by pipe (64) to the treater (34). The off gas separated by the treater (34) is sent to the flare (46) of the battery site via pipe (66). The crude oil separated by the treater (34) is sent to the crude oil collection system (38) of the battery site via pipe (40). The water separated by the treater (34) is sent to the water collection system (42) of the battery site via pipe (42).

Method

In another aspect of the invention, there is provided a method for converting natural gas into a refined product at a battery site of an oil production facility, the battery site being equipped with one or more of (preferably all of) a pipeline delivering an oil-water emulsion from an oil field to the battery site; a treater for separating the oil-water emulsion into crude oil, water, and a gas phase comprising natural gas, the treater preferably having an inlet, a crude oil outlet, a gas outlet and a water outlet; a crude oil collection system for collecting the crude oil from the treater; a water collection system for collecting the water from the treater; a flare for burning the gas phase from the treater; a gas burner for heating the treater; and an electrical supply,
the method comprising the steps of:
  a) collecting the natural gas at the battery site,
  b) feeding the natural gas to a natural gas refining unit comprising a reactor, or a plurality of reactors connected in series, and configured to convert the natural gas into the refined product, thereby producing the refined product, and
  c) collecting the refined product.

In embodiments, the natural gas refining unit is as described in the previous sections.

In embodiments, step a) comprises feeding the oil-water emulsion to a first vapor-liquid separator, thereby separating a gas phase containing natural gas from the oil-water emulsion, and collecting the gas phase containing natural gas.

In alternative embodiments, step a) comprises collecting the gas phase containing natural gas from the treater.

It will be apparent to the skilled person that the natural gas feed to the natural gas refining unit at step b) is typically contained in gas phase that may comprise other gases.

As noted above, the specific reactor or the plurality of reactors used in the natural gas refining unit of the invention will depend on the desired refined products. All the teachings above regarding the various elements of the invention (including reactors, the reactions, the products produced therein, the refined product, the first and second vapor-liquid separators, the three-phase separator, the heat exchangers, the location of the cooling heat exchanger, the off gas, gas compression, reactor operations, etc.) apply to the present method and are not repeated in the present section from conciseness.

In embodiments, the reactor or the plurality of reactors in the natural gas refining unit of the invention is:
  an oxidative coupling reactor (produces ethylene from methane),
  a direct methane conversion reactor (produces methanol, formaldehyde & ethanol from methane),
  an EME reactor (produces methanol from methane), or
  a methane reformer (produces syngas from methane) connected in series with:
    Fischer-Tropsch (FT) reactor (produces liquid hydrocarbons from syngas), or
    a methane conversion reactor (produces methanol from syngas).

Optionally, in embodiments, the reactor or the plurality of reactors comprises one or more additional reactor to further refine these products.

In preferred embodiments, the reactor or the plurality of reactors is a methane reformer connected in series with a FT reactor.

The method of the invention, wherein between about 1 and about 200 barrels of refined product produced per day (bbl d$^{-1}$), preferably between about 3 and about 50 bbl d$^{-1}$, and more preferably between about 5 and about 20 bbl d$^{-1}$ are produced.

The refined product produced by the reactor or the plurality of reactors (preferably the FT reactor) may be mixed with other products, including gas (e.g. remaining $H_2$, CO, $CH_4$), by-products (often water), which means that, often, a liquid/gas mixture containing the refined product is produced by the reactor or the plurality of reactors at step b). This liquid/gas mixture has often three phases: the gas phase, the aqueous phase, and the oil phases containing the refined product.

In embodiments in which the refined product is contained in a liquid/gas mixture, the method further comprises step d) feeding the liquid/gas mixture to the treater. Such embodiments are particularly preferred when the gas phase containing natural gas is separated from the oil-water emulsion by a first vapor-liquid separator at step a).

In alternative embodiments in which the refined product is contained in a liquid/gas mixture, the method further comprises step d') of feeding the liquid/gas mixture to a second vapor-liquid separator to separate the liquid/gas mixtures into its constituent an off gas and a liquid phase containing the refined product. Such embodiments are particularly preferred when the gas phase containing natural gas is collected from the treater at step a).

In further such embodiments, the method further comprises the step e) of releasing the liquid phase containing the refined product to the treater, thereby heating the treater.

In more specific embodiments, the second vapor-liquid separator is a three-phase separator and, in step d'), the liquid/gas mixture is separated into an off gas, an aqueous phase, and an oil phase containing the refined product. In further such embodiments, the method comprises the step e') of releasing the containing the refined product phase to a tank. In alternative embodiments, the method comprises the step e") of releasing the containing the refined product phase to the crude oil collection system of the battery site.

In embodiments, the method further comprises the step f) of releasing the aqueous phase into the water collection system of the battery site.

In further embodiments, the method further comprises the step g) of releasing the off gas to the gas burner of the battery site. In alternative embodiments, the method further comprises the step g') of releasing the off gas to the flare of the battery site.

In embodiments, the method further comprises the step h) of cooling a portion of the natural gas refining unit using heat exchange system circulating a heat transfer fluid and configured to cool a portion of the natural gas refining unit. In embodiments, the heat exchange system comprises at least one cooling heat exchanger installed in said portion of the natural gas refining unit.

In embodiments, the method further comprises the step i) of heating the treater using the heat exchange system.

In such embodiments, step i) comprises discharging hot heat transfer fluid from the cooling heat exchanger in the treater.

In alternative embodiments, step i) comprises heating a heat exchanger configured to heat the treater using hot heat transfer fluid from the cooling heat exchanger. In further embodiments, the method further comprises the step j) of returning cool heat transfer fluid to the cooling heat exchanger. In further embodiments, the method further comprises the step j') of discharging cool heat transfer fluid to the water collection system of the battery site.

In embodiments, the heat transfer fluid is water. In preferred such embodiments, water is collected from the water collection system of the battery unit and used as the heat transfer liquid. In other embodiments, water is collected from the treater unit and used as the heat transfer liquid. In yet other embodiments, the aqueous phase from the three-phase separator is used as the heat transfer liquid.

In further embodiments, the method further comprises the step k) using the electrical supply of the battery site to supply power to the natural gas refining unit.

In embodiments, the natural gas refining unit is mounted in a trailer.

In embodiments, the reactor is an oxidative coupling reactor.

In alternative embodiments, the reactor is a direct methane conversion reactor.

In yet other and preferred embodiments, the reactor or the plurality of reactors is a methane reformer connected in series with another reactor, such as a FT reactor.

In more preferred embodiments, the methane reformer is a CPOX reactor.

In preferred embodiments, at step b), the CPOX reactor is fed compressed air and compressed natural gas. In embodiments, the compressed air and compressed natural gas are at a pressure from about 10 bar to about 20 bar, preferably from about 15 bar to about 20 bar.

In preferred embodiments, at step b), the FT reactor is fed compressed syngas. In embodiments, the compressed syngas is at a pressure from about 10 bar to about 20 bar, preferably from about 15 bar to about 20 bar.

In embodiments, the method of the invention further comprises, before step a) or step b), a step of heating the CPOX reactor to a desired temperature, typically in the range of about 873 K to about 1273 K.

In embodiments, the method of the invention further comprises at step b, adjusting the air to natural gas ratio of the air and natural gas fed to the CPOX reactor to reach an acceptable conversion level at said desired temperature (about 873 K to about 1273 K).

In embodiments, the method of the invention further comprises, during step b), cooling the syngas as it moves from the CPOX reactor to FT reactor. In preferred embodiments, the syngas is cooled by the cooling heat exchanger to a temperature of about 473 K to about 550 K.

In embodiments, the syngas is fed to the FT reactor with a distributor.

In embodiments, the liquid/gas mixture is separated from the catalyst particles by a filter. In preferred embodiments the filter is located at an outlet of the FT reactor.

In preferred embodiments, the FT reactors comprise two or more outlets, each equipped with a filter.

In embodiments, the method further comprises during step b) sequentially cleaning the filter. In preferred embodiments, this is done by stopping the liquid/gas mixture flow to one of the outlets and then cleaning the filter of this outlet, while the flow is maintained (or transferred to) the other outlet.

Definitions

The use of the terms "a" and "an" and "the" and similar referents in the context of describing the invention (especially in the context of the following claims) are to be construed to cover both the singular and the plural, unless otherwise indicated herein or clearly contradicted by context.

The terms "comprising", "having", "including", and "containing" are to be construed as open-ended terms (i.e., meaning "including, but not limited to") unless otherwise noted. In contrast, the phrase "consisting of" excludes any unspecified element, step, ingredient, or the like. The phrase "consisting essentially of" limits the scope to the specified materials or steps and those that do not materially affect the basic and novel characteristic(s) of the invention.

Recitation of ranges of values herein are merely intended to serve as a shorthand method of referring individually to each separate value falling within the range, unless otherwise indicated herein, and each separate value is incorporated into the specification as if it were individually recited herein. All subsets of values within the ranges are also incorporated into the specification as if they were individually recited herein.

All methods described herein can be performed in any suitable order unless otherwise indicated herein or otherwise clearly contradicted by context.

The use of any and all examples, or exemplary language (e.g., "such as") provided herein, is intended merely to better illuminate the invention and does not pose a limitation on the scope of the invention unless otherwise claimed.

No language in the specification should be construed as indicating any non-claimed element as essential to the practice of the invention.

Herein, the term "about" has its ordinary meaning. In embodiments, it may mean plus or minus 10% or plus or minus 5% of the numerical value qualified.

Unless otherwise defined, all technical and scientific terms used herein have the same meaning as commonly understood by one of ordinary skill in the art to which this invention belongs.

Other objects, advantages and features of the present invention will become more apparent upon reading of the following non-restrictive description of specific embodiments thereof, given by way of example only with reference to the accompanying drawings.

DESCRIPTION OF ILLUSTRATIVE EMBODIMENTS

The present invention is illustrated in further details by the following non-limiting examples.

Example 1—Techno Economic Analysis of a Micro Gas-to-Liquid Unit for Associated Natural Gas Conversion

Abstract

Here we report a techno-economic analysis of a commercial mobile manufacturing plant that processes 100 m³ h⁻¹ of methane via a tandem short contact time catalytic partial oxidation (SCT-CPOX) and a single-pass Fischer-Tropsch fluidized bed to produce 7 bbl d⁻¹. Starting from natural gas and air, a thermodynamic analysis identified the optimized operating conditions considering both carbon yield, CO/H$_2$ ratio and adiabatic conditions. We studied the flammability limits of the mixture at operating pressures and temperatures. The economic analysis itemizes costs for all equipment rather than applying scale-up power law or factors. The greatest contributors to direct costs are the compressors and the CPOX reactor. Operating CPOX at 2.0 MPa reduces reactor volumes but to achieve 90% conversion and selectivity requires operating this unit above 900° C. Avoiding syngas compression and upstream syngas conditioning reduces capital costs. The capital cost (CAPEX) reaches 570 000 USD when the whole process operates at 2.0 MPa. Considering numbering-up, the price of the 100th unit approaches 360 000 USD thus the micro refinery unit (MRU) increases profitability. We demonstrate how thermodynamics constrains methane conversion and syngas selectivity. A large part of achieving low CAPEX is operating a single pass process, building multiple units, and replacing the natural gas to heat the treater at the oil battery with the incondensable leaving the three phases separator downstream the Fischer-Tropsch.

1. Introduction

In this study, we report: a thermodynamic analysis that minimizes carbon formation that maximizes syngas selectivity for a high-pressure air blown SCT-CPOX a safety analysis based on flammable limits for the SCT-CPOX operating with CH$_4$ and air at 2.0 MPa and 800° C. to 1000° C. an innovative integration of a small-scale GTL unit, comprising a single pass FT reactor, in the existing oil battery facility a CAPEX estimation based on manufacturers quotes.

2. Process Description

GTL processes comprise desulphurization, compression, syngas generation, liquid fuel production, product separation, and upgrading (and those based on autothermal reforming require oxygen separation). The process presented in this Example considers compression, syngas, FT, and product separation: syngas produced via catalytic partial oxidation enters a FT fluidized bed where it reacts to synthetic fuel. Heat transfer rates in fluidized bed are close to an order of magnitude greater than fixed bed reactors at >700 Wm⁻²° C.⁻¹, which minimizes heat transfer surface. Solids back-mixing in fluidized beds ensures isothermal conditions reducing catalyst deactivation due to hot spots typical of fixed bed reactors. FT reactors with iron catalyst operate at 2.0 MPa and above 300° C. Cobalt catalyst operate below 240° C. but newer formulations operate as high as 280° C. [21, 22]. A three-phase-separator knocks-out water from the FT hydrocarbons and non-condensable gases—a mixture of light C3-products, unreacted syngas, and N$_2$.

In low pressure CPOX, a compressor pressurizes H$_2$, CO, unreacted CH$_4$ and N$_2$ downstream the reformer before FT synthesis (FIG. 1). When CPOX operates at high pressure, compressors elevate CH$_4$ and air pressure upstream of this vessel but downstream any desulphurization unit (FIG. 2). In the case of a stoichiometric mixture of methane and pure oxygen, total gas volumes of reactants are half of the effluent volumetric flow rate. With air, the volumetric expansion is less pronounced because of the nitrogen ballast and so the total volumetric flow rate is close to the effluent of the low pressure process [23]:

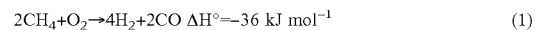

$$2CH_4 + O_2 \rightarrow 4H_2 + 2CO \quad \Delta H° = -36 \text{ kJ mol}^{-1} \tag{1}$$

Therefore, compressing energies upstream and downstream CPOX are comparable as the volumetric flows.

The proposed process directly utilizes methane and air without including oxygen and nitrogen separation. Nowadays, Pressure swing absorption (PSA), cryogenic separations (CS) columns and membrane produce oxygen or oxygen enriched air. Membranes are not cost-competitive compared to PSA and CS and require either an air compression stage before or after the unit (or both). Banaszkiewicz et al.[24] estimate that the minimum (thermodynamic energy required) to produce 1 ton of oxygen is 53.1 kWh. At today, for large scale plants, the energy required is more than double. Even though oxygen decreases the inert gases and therefore the volume of reactor, the cost of the air separation unit makes the MRU unit uneconomic. Using pure oxygen in this unit also poses safety issues since the gas mixture and products falls in the flammability range of composition. We ignore the configuration where CPOX operates from 5 bar to 15 bar while FT at 20 bar as in this case, three compressors are required, which increases capital investment.

2.1. Catalytic Partial Oxidation—CPOX

The steam methane reforming SMR process produces syngas with a H$_2$/CO ratio of 3:1, while the ratio from partial oxidation (POX) is ideal for Fischer-Tropsch at 2:1 but require pure O$_2$. Furthermore, POX is exothermic (Eq. 1) while SMR is endothermic and requires as much as 10% to 20% excess methane to supply heat to maintain the endothermic reaction [25]. POX was first reported by Liander et al. in 1929 who coupled it to ammonia synthesis [26]. At the same time, also Padovani et al. described the reaction [27], but only in 1946 Prettre et al. reported Ni catalyst activity at 700° C. to 900° C. and 1 bar [28]. Thermal activation of methane starts above 900° C. but, catalyst can decrease it to below 500° C. [29]. Normally CPOX operates below 1000° C. where the reaction sequence depends on catalyst and process reaction and follows either the direct (Eq. 1) or the indirect pathway in which methane combusts to CO$_2$ and H$_2$O first (Eq. 2) and afterward reforms with the excess of CH$_4$ (Eqs. 3,4) [30, 31, 32, 33, 34, 35].

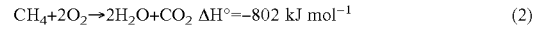

$$CH_4 + 2O_2 \rightarrow 2H_2O + CO_2 \quad \Delta H° = -802 \text{ kJ mol}^{-1} \tag{2}$$

$$CH_4 + H_2O \rightarrow 3H_2 + CO \quad \Delta H° = 206 \text{ kJ mol}^{-1} \tag{3}$$

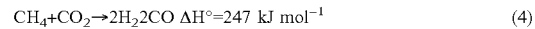

$$CH_4 + CO_2 \rightarrow 2H_2 2CO \quad \Delta H° = 247 \text{ kJ mol}^{-1} \tag{4}$$

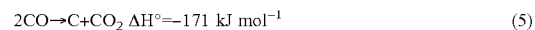

$$2CO \rightarrow C + CO_2 \quad \Delta H° = -171 \text{ kJ mol}^{-1} \tag{5}$$

Regardless of the reaction mechanism, the equilibrium reaction between air and methane at 0.2 MPa and 800° C. is thermally auto-sustainable (adiabatic) when the reactants enter above 300° C. at a CH$_4$/O$_2$ ratio of 1.67 [36]. At this ratio, 85% of the methane reacts at 0.2 MPa, and 700° C. while at 2.0 MPa, the temperature must reach 900° C. [18, 37]. In 1998, ConocoPhillips developed a CPOX process and built two pilot plants and two demonstration scale facilities in Ponca City. They showed that low pressure reactors, typically studied in academia were unrepresentative of commercial conditions and thus unhelpful for scale-up [38]. Currently, Eni S.p.a. is studying and developing the first industrial short contact time CPOX unit [39, 40].

2.2. Fischer-Tropsch

Fischer-Tropsch synthesis is a highly exothermic reaction that polymerizes CO to alkanes and produces water (Eq. 6). FT synthesis requires tight temperature control to minimize hot spots that reduce product selectivities [11]. To increase heat transfer rates, fixed bed configurations comprise multi-tubular reactors 25 mm in diameter, while recent designs include inserts and foams to increase contact between the walls and catalyst but also increase reactor complexity [41].

$$nCO+(2n+1)H_2 \rightarrow C_nH_{2n+2}+nH_2O \quad \Delta H°=-165 \text{ kJ/mol} \quad (6)$$

Industrial FT reactors convert less than 60% to 80% of the CO to minimize $CH_4$ and $CO_2$ selectivity that increases with $H_2O$ partial pressure [42]. The axial partial pressure profile of water is more uniform using air rather than oxygen in the synthesis gas step therefore it improves selectivity and facilitates higher single pass CO conversions. Pt—Co catalysts promoted with Mn convert up to 90% of the CO while maintaining the $C_{5+}$ yield greater than 75%, which alleviates the need for syngas recycle, which is impossible in presence of inert like $N_2$ (air-blown CPOX) [22]. In this study, the statistical description for the formation of carbon bonds was replaced by product selectivities from bench scale experiments (Table 1).

TABLE 1

| FT reaction performance [43] | |
|---|---|
| Temperature | 300° C. |
| Pressure | 20 bar |
| CO conversion | >0.80 |
| $C_{4-}$ | 0.36 |
| $C_{4+}$ | 0.64 |

2.3. MRU Integrated into an Existing Oil Battery

Integrating the MRU with a battery unit, rather than treating the stranded gas at the well-head reduces the number of unit operations (heat exchangers, separator, are, turbines) and thus investment. Furthermore, overall yield is maximized by substituting the off-gas from the 3-phase MRU separator (containing $H_2$, $C_{4-}$, and CO) by the methane that heats the treater. In many oil fields, the water load exceeds 90% of the total mass extracted from the reservoir. Other potential heat integration strategies are possible with the energy generated in the FT-reactor. Since electricity is already available at battery sites, no provision is required to generate electricity to supply energy to compressors. While sour wells require an additional pretreatment step to remove $H_2S$, in this analysis we assume to use sweet gas only. Differently than reforming, CPOX catalysts are not easily deactivated by sulphur.

This techno-economic analysis considers equilibrium performance, consistent with bench scale reformers [44]: 60% of the total capital investment is attributable to the reformer and therefore optimizing its performance has the largest impact on economic feasibility [45, 46, 47]. Since the water content in the syngas is less than 10%, water removal step between CPOX and FT is unnecessary, as long as syngas does not require compression. Here we compare the economics of a FT-GTL process with either a high pressure or a low pressure CPOX step.

3. Methodology

The economic analysis relies on equipment and instrumentation suppliers quotes and neglect operating parameters except ordinary maintenance and gas compression cost for the plant to produce 7 bbl d$^{-1}$. Integration of MRU in the existing facility maintains the usual operating procedures that include a slip stream of flared gas that is fired in the oil treater to accelerate the demulsification. Even when the flared gas is entering the MRU a certain amount of fuel gas, in this case coming from the three-phase separator downstream the FT, remains available. The only difference is the higher flow rate as the heating value of this gas is lower as considerable amount of $N_2$ is diluting.

3.1. CPOX

The design of the CPOX is based on scaling-up a 15 mm diameter bench scale-reactor. Considering a 3 mm gauze bed height (the catalyst support), the reactor diameter is 61 cm when operating at 0.2 MPa and 22 cm at 2.0 MPa. Adding a second gauze layer while maintaining the same contact time, reduces by factor of two the reactor diameters to 30.5 cm and 11 cm. Pressure drop is below 0.1 bar, which is suitable for industrial operation.[48] Electrical elements preheat the reactor/catalyst to light off the reaction. Alternatively, hydrogen or methane combustion with air raises the temperature of the catalyst during start-up. The reactor materials specification depends on pressure, skin temperature, and gas composition. Hot wall reactors insulate the exterior, which exposes the metal to the reaction environment, but the reactor diameters are smaller. In our case, we add $Al_2O_3$ ceramic insulation to the interior (cold-wall operation), which increases the reactor diameter and unit lifetime but is operational with a lower grade of steel since the skin temperature is maintained below 125° C. A 304 L stainless steel shell is suitable for its mechanical, oxidation resistance and lower cost compared to 316 Stainless Steel, Ni—Cr alloy, or Hastelloy.

3.2. FT Design

The minimum fluidization velocity, $U_{mf}$ of the FT catalyst is 3 mms$^{-1}$. Considering a gas velocity approaching 0.20 m s$^{-1}$ (P=2.0 MPa; T=300° C.) the resulting reactor diameter is 0.4 m. Gas residence time of 10 s requires a bed height of 2 m. We have used for the methane conversion and syngas selectivities coming from thermodynamic equilibrium. Our experimental tests related to conversion and selectivity in a bench scale reactor operating a maximum 8 L min$^{-1}$ of methane partially confirmed the assumption that the reactor was at values close to the thermodynamic equilibrium [44]. On the other side, short contact time does not reach the thermal equilibrium gas-catalyst thus is possible to operate at performance that are competitive to the equilibrium [39].

For the design of the cooling coils, we calculated the enthalpy of reaction, flow rate, conversion, and products selectivities. The exchange surface area considers inlet cooling water at 25° C. We verified the design considering the cooling coils effect on linear velocity and residence time when they are immersed in the bed.

Figure 5:
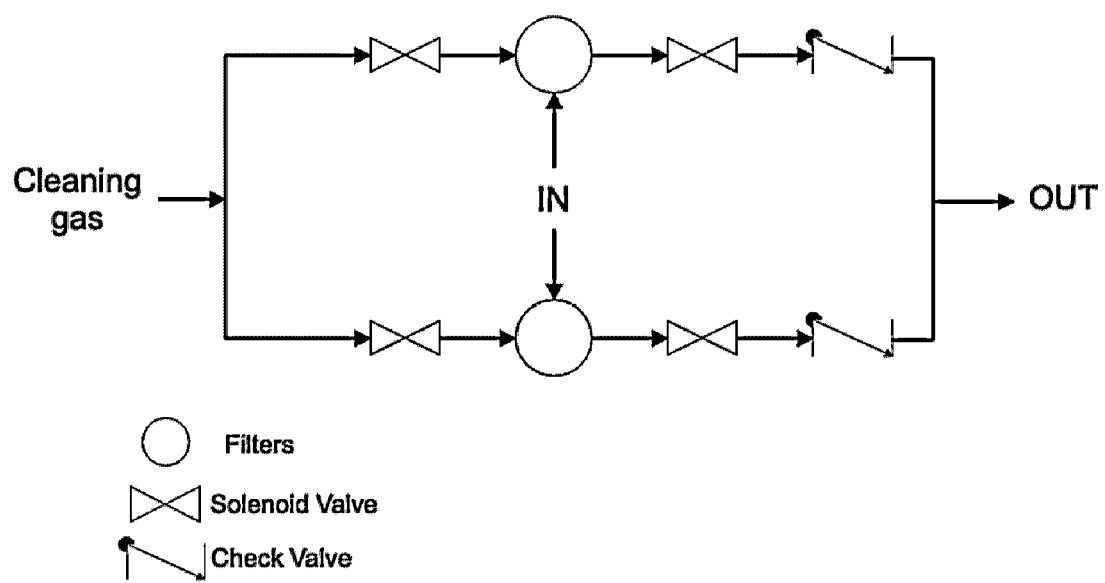
FIG. 5 Control loop for filters cleaning

Calculating the height and the width of the jets, which have to avoid contact between reactor walls and cooling coils, we chose a sparger instead of a grid with a wind-box. This solution was more suitable for a MRU: lower pressure drop, 80% cheaper and easier to change and modify according to the fluid dynamics that was not investigated when the heat exchanger is immersed in the catalytic bed. The gas stream above the transport disengaging height (TDH) flows across two filters in parallel. The filters, which replace cyclones, provide a cheaper, more compact, and robust solution for small scale fluidized bed reactors. The filtration system removes the catalyst particles entertained in the gas flow and uses two differential pressure transducers that measure the pressure drop across the filter (FIG. 5). This difference in pressure, given by the filter, indicates clogging and therefore activates the cleaning system. Changing the position of two valves, $N_2$ burst flow inside the filter and in counter-current removes the particles from the surface. FT reactor, cooling coils and filtering system are manufactured in 316 stainless steel.

3.3. Control, Instrumentation and Safety

The lower flammability limit (LFL) of methane in air is 4.4% and the upper flammability limit (UFL) is 16.4% at ambient pressure and temperature. It expands to about 40% at 2 MPa (Table 2) [49]. The stoichiometric feed concentration of methane and oxygen, fed as air, is 2.1 (17%) but this value is not applicable as only ratios between 1.4 to 1.8 minimizes carbon formation. Since at the process temperature the feed conditions lie above the autoignition temperature, mixing methane and air represents a safety hazard [50, 51]. The inlet gas composition for low pressure CPOX lies above the UFL that corresponds to a $CH_4/O_2$ ratio of 1.2 at 1000° C. Limiting-oxygen concentration (LOC) is the volume fraction of oxygen required to sustain a flame (Table 2).

TABLE 2

| Flammability features of $CH_4$, CO and $H_2$ in air at 20 bar | | | |
|---|---|---|---|
| Species | LFL, vol % | UFL, vol % | LOC, mol % |
| $CH_4$ | 5.0 | >40.0 | 11.1 |
| CO | 12.5 | >90.0 | 5.1 |
| $H_2$ | 4.0 | >75.0 | 4.8 |

Presence of CO and $H_2$ increase the safety hazard of the process. To minimize risk associated with these gases and the possibility of a deflagration requires that the oxygen volume fraction after CPOX reaction remains below 0.06 mol mol$^{-1}$ (the LOC). Based on these considerations, appropriate control strategies are required in an inherently safer design (ISD) perspective.

The final operating version of the plant requires detailed studies to track the flammability behaviour of evolving $CH_4$—CO—$H_2$ mixtures in the reaction stage and identification of possible flammable pockets [52].

Safety loops that detect and prevent possible failures and hazardous scenarios and detailed operating start-up and shut-down protocols are necessary for the high temperature and pressure operation. Monitoring the reactor with high frequency thermocouples coupled with gas sensors ensure safe operation while minimizing false negatives: a thermal excursion—a rapid increase in temperature due to an uncontrolled reaction—trips an interlock only when a thermocouple measures a sudden rise in temperature possibly accompanied by a change in the gas composition [53, 54].

Two mass flow controllers (fail-close) maintain a tight control of the feed gases and an additional valve (fail-open) controls the flow of inert that purges the system in case an interlock is tripped.

Two thermocouples, at distinct radial positions, with a temperature range from 0° C. to 1200° C. monitor the temperature of the catalytic bed. A proportional integral logic controls the supply of heat through the heating elements inside the CPOX reactor. Two additional thermocouples, near the heating elements ensure the integrity of the ceramic insulation: a temperature exceeding 1050° C. triggers an interlock. Two pressure transducers measure the pressures in CPOX and FT reactor that trip an interlock if the pressure exceeds 2.2 MPa. Both reactors have safety valves and rupture disks in case the control system is inadequate to respond to a sudden increase of the pressure.

Figure 6:
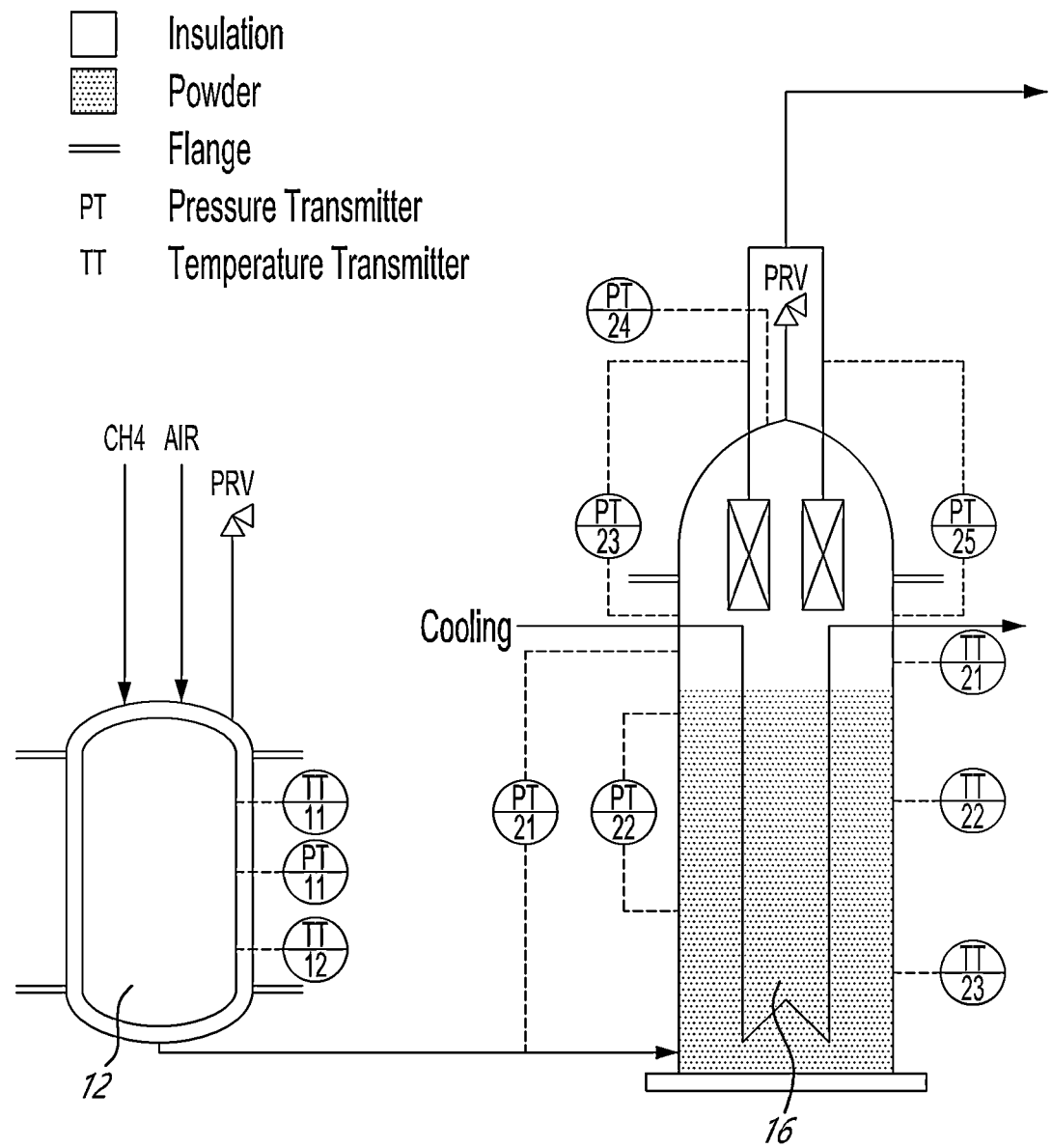
FIG. 6 Process layout

FIG. 6 shows the process layout used using a CPOX reaction (12) and a FT reactor (16). Three thermocouples monitor the temperature in the Fischer-Tropsch reactor that operates up to 350° C. at three different axial position with 0.5 m distance. The transmitters are linked to a proportional integral and derivative (PID) controller that modulates the control valve downstream the cooling coils. Diaphragm differential pressure transducers monitor bed density, bed height and any abnormal operations like defluidizations. An additional pressure transducer measures the pressure drop across the sparger. Four gas sensors next to the units operation detect $H_2$, CO, LFL, and smoke and trip the interlock in case gas thresholds are reached. The emergency interlock:
  i. turns off the furnace inside the CPOX reactor,
  ii. shuts down the flows of first air then $CH_4$,
  iii. purges the system with inert gas,
  iv. activates acoustic and visual alarms.

All instrumentation is intrinsically safe and certified to operate in zone 1 division 1 [55]. Operators manipulate process variable from a control panel or remotely based on LabView® loaded on a cRIO controller.

3.4. Modeling

We completed mass and energy balances with Aspen-Plus®. The Peng-Robinson equation of state with the Boston-Mathias alpha function calculated fugacities and thermodynamic properties of the gas mixtures [56, 57]. FactSage 7.3 equilibrium calculations confirmed the Aspen-Plus® equilibrium calculations of the CPOX reactor. We identified methane and air flowrates to minimize coke build-up. We modelled the CPOX reactor with RGibbs and considered that it operated adiabatically. Furthermore, catalyst reacts methane and air to equilibrium (kinetics were not limiting), which is consistent with bench scale reactor performance.

The Fischer-Tropsch reactor is simulated as a stoichiometric reactor (Tab. 1). Vertical cooling coils withdraw the heat of reaction and maintain isothermal conditions. To minimize ancillary heat exchangers, the syngas in the case of high pressure CPOX enters the fluidized bed reactor hot (>600° C.).

3.5. Operation Cost Estimate

The economics of the process is based on 8000 h per year [58]. While methane is available on the market at 0.38 USD kg$^{-1}$ as stranded gas has no value (and in the future, countries may impose a cost to flare). The real and considered operating cost of the process is compression. Unreacted CO, CH$_4$, C$_2$H$_6$, C$_3$H$_8$ vent to the utility are of the battery unit even if in remote locations, these gases can be used in the battery three phase separator or generate electricity to drive the compressors. Methane conversion in CPOX ranges from 85% to 95% while the Fischer-Tropsch unit reacts more than 80% of the CO. At the outlet, the three phase separator works at 2.0 MPa to recover C$_{4+}$ hydrocarbons and we assume the value of this product is 0.55 USD kg$^{-1}$.

The production costs take into account capital depreciation, taxes, and interest on working capital as well as ordinary maintenance. The process takes place on site at an existing oil battery unit and therefore transportation costs of raw materials and products are neglected. Costs related to handle the produced water from FT are zero as it will be pumped downhole with the water coming from the oil production.

The annual production cost is the sum of the Fixed Capital Investment, IFC and compression costs:

$$C_{operation} = I_{FC}(p_a + p_m + p_{ti} + p_{wc}) + C_{compression} \quad (7)$$

pa is the percentage of annuity depending on the interest rate and the process lifetime, pm is the percentage of the IFC for maintenance, pti is percentage of IFC for tax and insurances, and pwc is the interest for the working capital. We assume an interest rate of 8% and a 10-year amortization period. Combining mass and energy balances we calculated the economic potential of the process changing the operating condition of the CPOX reactor:

$$P = C_{products} - C_{operation} \quad (8)$$

The final output of the FT rector also changes as function of the inlet syngas composition and flowrate.

4. Results and Discussion

Figure 7:
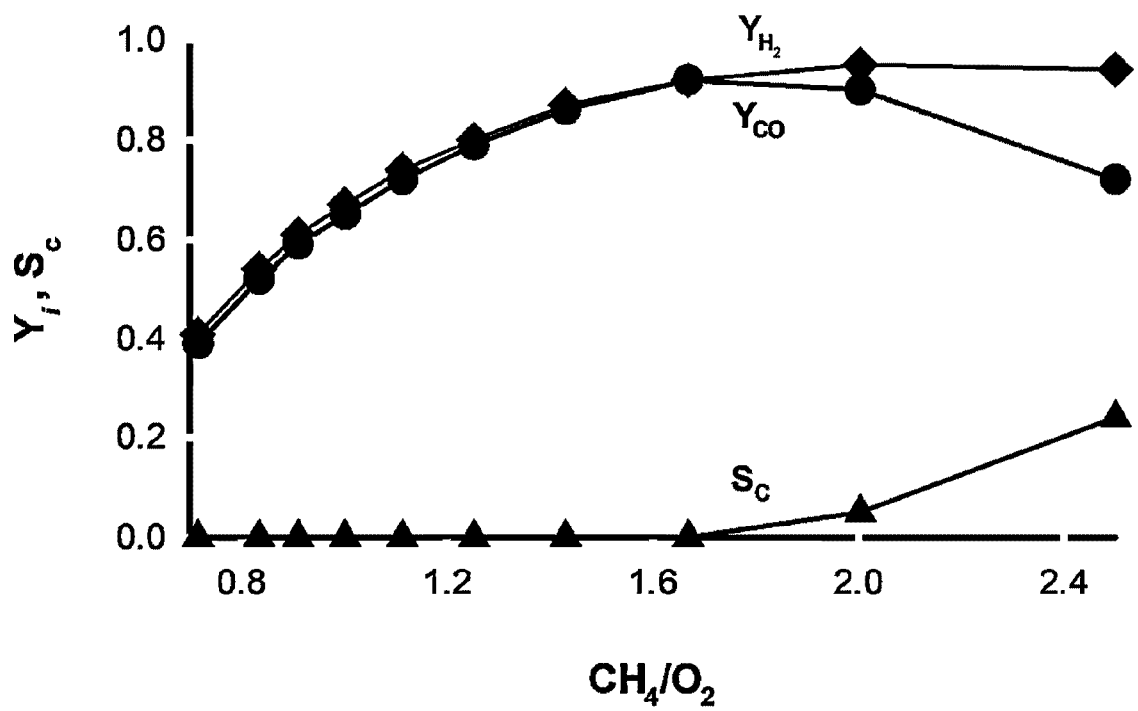
FIG. 7 Carbon selectivity, CO and $H_2$ yield as function of $CH_4/O_2$ ratio for CPOX at 0:2 MPa and 800° C.
Figure 8:
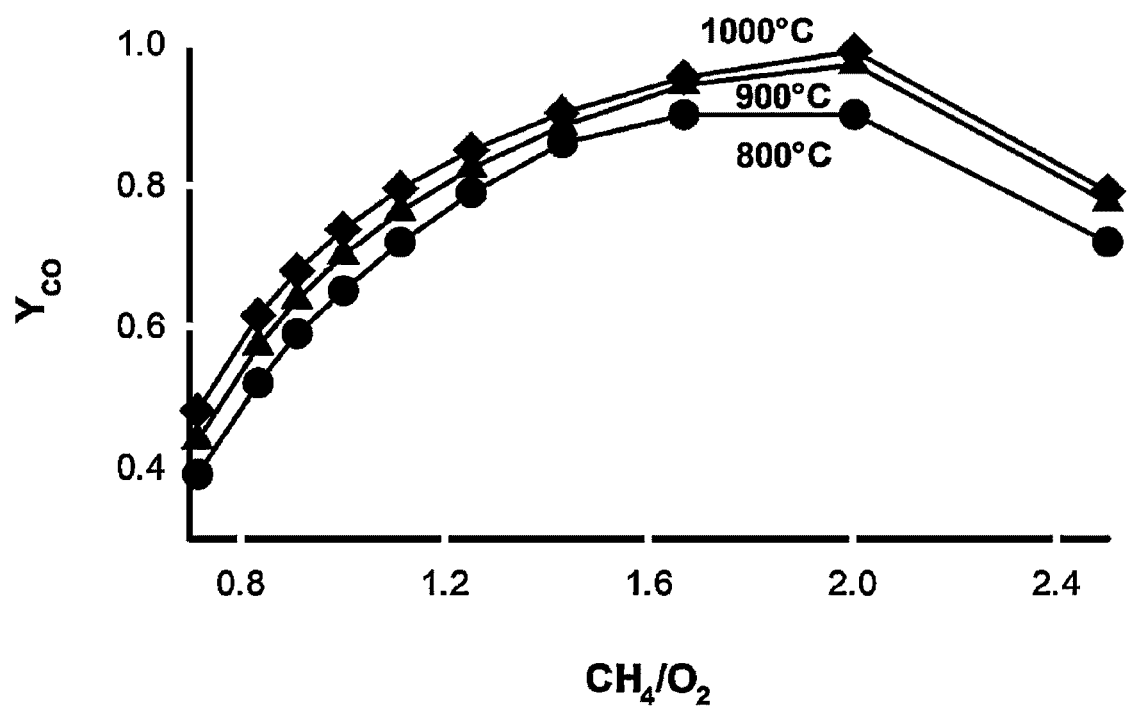
FIG. 8 CO yield vs $CH_4/O_2$ ratio for CPOX at 2 MPa and 800° C. to 1000° C.
Figure 9:
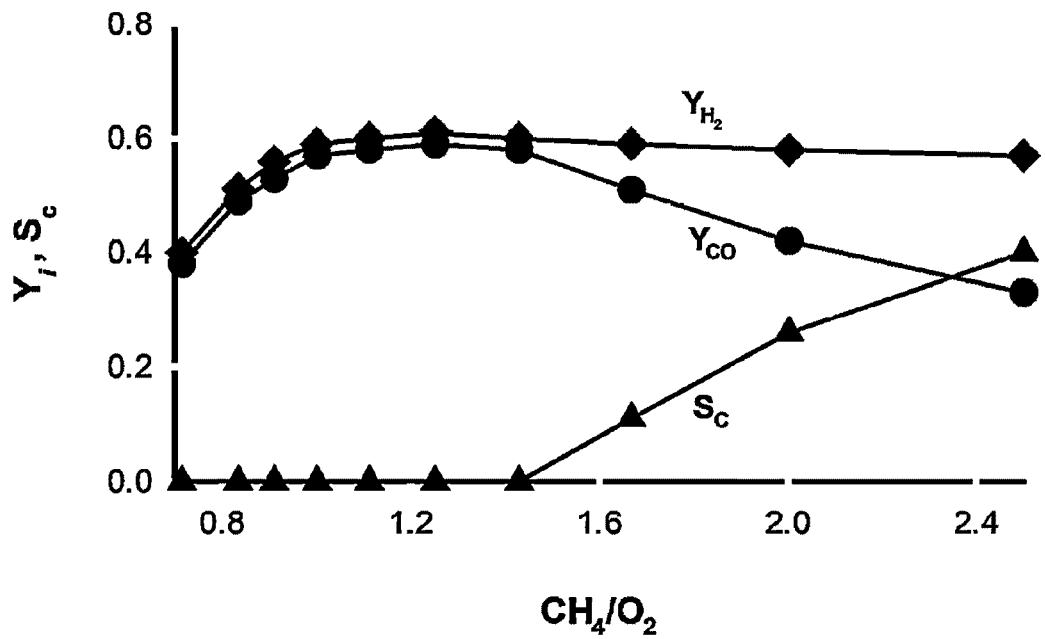
FIG. 9 $H_2$/CO ratio, carbon selectivity and CO yield as function of $CH_4/O_2$ ratio for CPOX at 2:0 MPa and 800° C.
Figure 10:
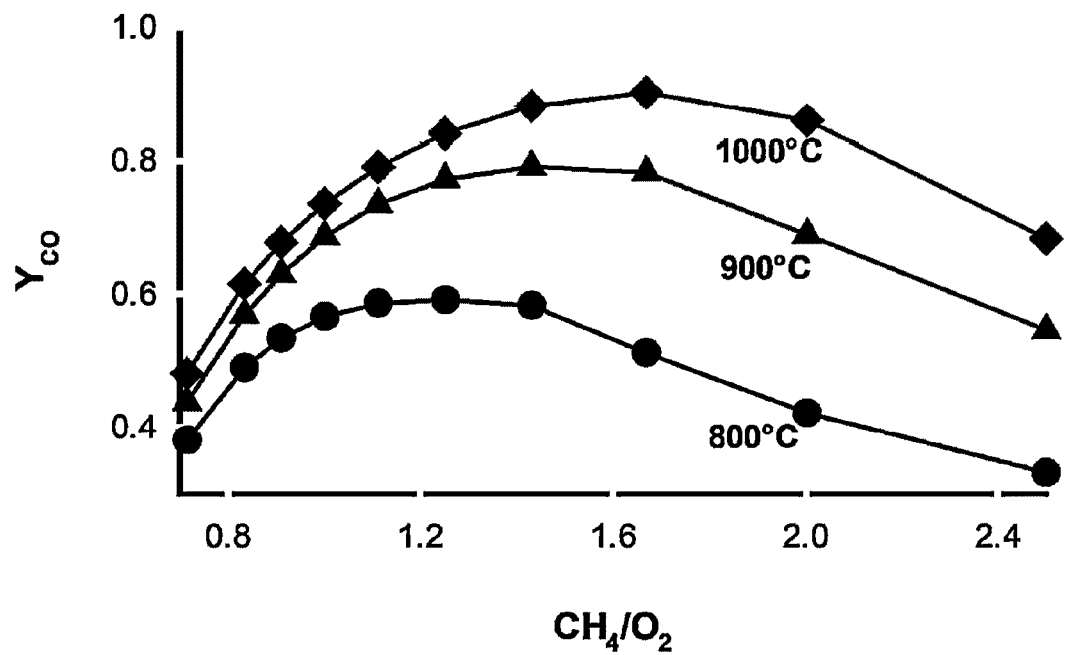
FIG. 10 CO yield vs $CH_4/O_2$ ratio for CPOX at 2 MPa and 800° C. to 1000° C.

We first identified the maximum CH$_4$/O$_2$ ratio that minimizes carbon formation based on thermodynamic equilibrium. Independently of pressure, increasing the O$_2$ concentration decreases coke formation. A further increase of O$_2$ decreases CO yield because both CO$_2$ selectivity and CH$_4$ conversion increase. At 0.2 MPa, 800° C. and CH$_4$/O$_2$ ratios lower than 1.65 maximizes CO yield while minimizing carbon selectivity (FIG. 7). Increasing temperature (all other conditions being equal) reduces the tendency to form coke as the Boudouard equilibrium (Eq. 5) shifts toward the production of CO. All these results match Javorski and Pianko-Oprych's [59], that conducted a theoretical study on the equilibrium conditions for carbon deposition at 0.3 MPa and 3 MPa, from 773K to 1273 K. CO yield approaches 100% at 1000° C. and a CH$_4$/O$_2$ close to 2, (stoichiometric value for CPOX, Eq. 1) (FIG. 8). We adopted this logic to identify the optimal conditions when the CPOX operates at 2.0 MPa. Here coke formation is negligible at CH$_4$/O$_2$=1.45 (FIG. 9, FIG. 10) and the ratio of H$_2$/CO is almost 2. Aspen results agree with Factsage equilibrium calculations, with Seo et al. [36], who also studied optimal conditions for the CPOX at 1 bar and with Enger et al. at high pressure [18].

At 0.2 MPa CPOX operates adiabatically as long as the CH$_4$/O$_2$ ratio is equal to 1.65. Increasing reaction temperature requires pre-heating the feed gases more (Tab. 5) because the higher selectivity toward CO generates less heat since combustion to CO$_2$ is lower. To reach 1000° C. requires a feed gas temperature of 580° C. but lowering the CH$_4$/O$_2$ (which lowers the heat requirement) decreases CO yield. CPOX yield to CO rises from 0.90 at 800° C. to 0.94 above 900° C. while H$_2$/CO ratio decreases from 2.00 to 1.94; CO selectivity increases faster than H$_2$ at increasing temperature (FIG. 7).

TABLE 5

Energy balance from Aspen simulation at 1 bar

| $T_R$, ° C. | $T_{Pre}$, ° C. | $Q_{Pre}$, kW | $Q_{FT}$, kW |
|---|---|---|---|
| 800 | 320 | 43 | −150 |
| 900 | 450 | 66 | −150 |
| 1000 | 580 | 89 | −150 |

CPOX operating at 2.0 MPa and 800° C. and requires cooling the feed gas to −20° C. at a 1.45 CH$_4$/O$_2$ ratio (Table 6) as the competitive methane combustion releases excessive heat: increasing the CH$_4$/O$_2$ ratio decreases the amount of heat released by combustion but carbon builds up on the catalyst. Operating above 800° C. adiabatically is feasible. Starting up the reactor with a low ratio would avoid investing in start-up heaters. CO yield increases from 50% to 90% increasing temperature from 800° C. to 1000° C. At this high pressure, the ratio H$_2$/CO drops from 2.04 to 1.87 because of the improved CO selectivity.

TABLE 6

Energy balance from Aspen simulation at 20 bar.

| $T_R$, ° C. | $T_{Pre}$, ° C. | $Q_{Pre}$, kW | $Q_{FT}$, kW |
|---|---|---|---|
| 800 | −20 | — | −90 |
| 900 | 70 | 6 | −130 |
| 1000 | 300 | 44 | −140 |

$T_R$ = reaction temperature,
$T_{Pre}$ = preheating temperature,
$Q_{Pre}$ = heat for preheating,
$Q_{FT}$ = heat for the FT reactor

4.1. Capital Investment Estimate

The economic assessment compares low- and high-pressure process costs, where FT operating parameters are constant at 300° C. and 2.0 MPa. We define the capital investment as the sum of all the direct costs and includes engineering, building (customize container and electrical system), piping and plumbing, process instrumentation and control code programming additionally to reactors, separator, and compressors costs. The indirect ones consider management, insurances, and interest on capital.

The equipment prices are 78 000 USD for CPOX at high pressure and 180 000 USD for low pressure while FT reactors cost 45 000 USD. Downstream, the high pressure three phase separator costs 45 000 USD. Syngas compressors cost 570 000 USD whereas both air and methane compressors are 230 000 USD (Tab. 3). The percentage of all additional items compared to the reactors and compressors total price agree with literature (Tab. 4) [60, 11]. We considered quotes and when not possible standard factors for the costs (Table 4). All values are in the range of those reported by Peters et al.

TABLE 4

Percentage factor for direct and indirect costs for the MRU working with CPOX at 20 bar

| Items | | Source |
|---|---|---|
| Building | 8% | quotes |
| Electrical system | 14000 USD | |
| Container | 14000 USD | |
| Piping | 1% | quotes |

TABLE 4-continued

Percentage factor for direct and indirect costs
for the MRU working with CPOX at 20 bar

| Items | | Source |
|---|---|---|
| Instrumentation and control | 14% | quotes |
| Control Programming | 15000 USD | |
| MFC and Valve | 15000 USD | |
| Safety equipment | 7000 USD | |
| Transmitter | 8500 USD | |
| Start up | 12% | [11] |
| Maintenance | 11% | [60] |
| Engineering | 12% | [60] |
| Contingencies | 8% | [11] |

4.2. Production Cost

The useful life of capitals from chemical manufacturing plants is 9.5 y (asset class 28.0, manufacture of chemicals) [61], therefore we assumed a project life of 10 years. Equipment depreciation together with insurance and maintenance contributes 65% to overall $C_{operation}$ for both low- and high-pressure cases, while compression represents the other major contribution. At 0.2 MPa, syngas yield is reasonably independent of operating temperature but uneconomic. Operating at 800° C. is preferable as the material and manufacturing costs will be lower as the reactor shell diameter will be smaller. Disregarding the lower capital costs coming from lower temperature operation, the low-pressure GTL loses over 70 000 USD $y^{-1}$.

Figure 11:
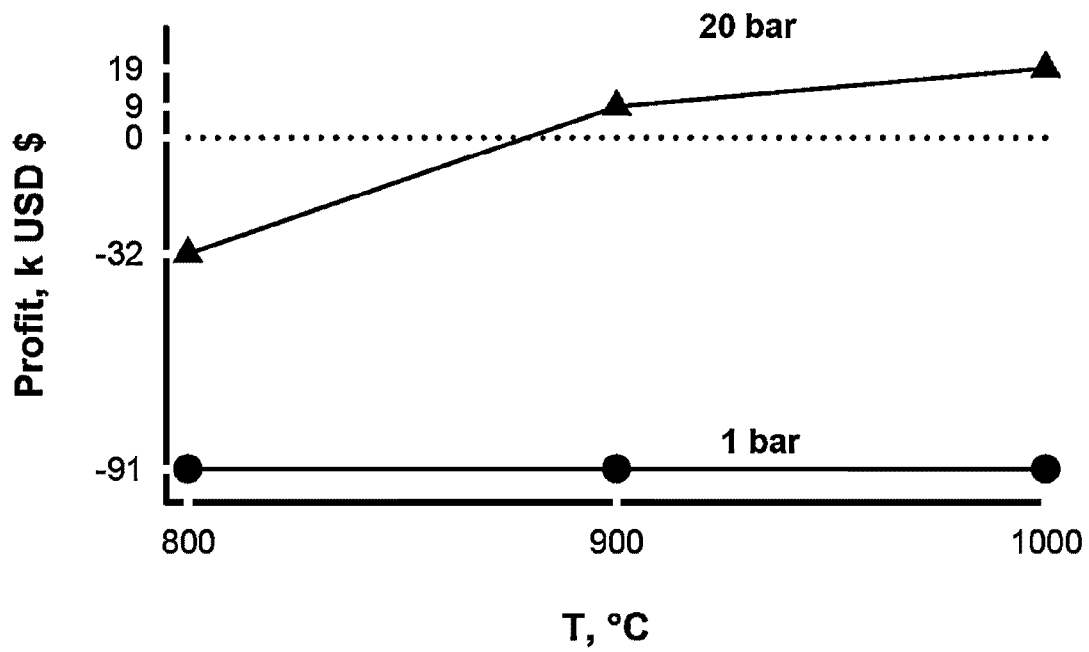
FIG. 11 Profit of the MRU in 1000 USD$ as function of the operating temperature for 1 bar and 20 bar.

At all conditions, the economics of operating the CPOX at high pressure is better than at low pressure (FIG. 11). Cost of syngas compressor and CPOX reactor are twice higher at 0.2 MPa compared to 2.0 MPa (Table 3). The compression cost for the low-pressure configuration is 1.4 times higher. An important capital costs we neglected in the low pressure CPOX is the extra heat exchanger and gas conditioning to remove any condensable ($H_2O$) before entering the syngas compressor. High pressure GTL profitably improves with operating temperature due to the increasing syngas yield.

TABLE 3

Equipment prices

| | Price, USD |
|---|---|
| Low pressure | |
| CPOX reactor | 185 000 |
| FT reactor | 50 000 |
| Separator | 20 000 |
| Syngas compressor | 570 000 |
| High pressure | |
| CPOX reactor | 80 000 |
| FT reactor | 50 000 |
| Separator | 20 000 |
| Air compressor | 6 000 |
| $CH_4$ compressor | 160 000 |

4.3. Energy Integration

The influence of heat integration improves the economic potential as the energy efficiency increases but this is more important for large scale units [47, 40]. In our case, heat losses are greater, and the economies of scale are poorer and the hurdle to justify additional capital is greater. Total capital investment is indeed the limiting factor to the implementation of decentralized and intensified plants. We can recover heat at the effluent of the CPOX reactor (900° C.) and/or in Fischer-Tropsch but this would require additional expensive gas heat exchangers. Alternatively, the reagent methane and air could cool the FT effluent, but the preheating temperature in this case would be maximum 300° C. Radiation and conduction within the catalyst together with absence of thermal equilibrium between product stream and catalyst surface, coming from short contact time, will reduce the required preheating temperature [62]. This non-equilibrium state helps in achieving adiabatic conditions even when gas preheating is lower than 200° C. when operating CPOX in equilibrium at 1000° C.

The FT is best operated iso-thermally, which requires cooling coils. Generating steam from the cooling water could provide electricity to offset the compression costs (45 000 USD $y^{-1}$) but also in this case capital cost might be the hurdle. Future studies and process integration with oil batteries operators would help the MRU to penetrate the market.

Considering the high-pressure scenario, the greater source of electric energy consumption are the two compressors that brings air and natural gas to 2 MPa. According to the manufacturer quotes, they consume 75 kW. Canada electricity mix generates 0.14 kg $CO_{2eq}$ $kW^{-1}$ (0.8 kg $CO_{2eq}$ $kW^{\beta-1}$ for Alberta) [63]. Their emission is therefore 252 kg $CO_{2eq}$ $d^{-1}$ in terms of mole, 0.26 kmol $CO_{2eq}$ $h^{-1}$. The MRU treats about 4.5 kmol $h^{-1}$ of methane that would otherwise be burnt and emitted 4.5 kmol $CO_{2eq}$ $h^{-1}$. Therefore, if MRU converts more than 5.7% of methane it is more beneficial than what it consumes in terms of $CO_2$ emitted (25% considering Alberta only). The overall methane conversion is around 40%. Concerning unreacted gases, since MRU is fully integrated with oil battery facilities, these can be sent to flaring as all other natural gas. Therefore, we did not consider the emission of toxic or explosive gases in the atmosphere.

4.4. Numbering Up Economics

Figure 12:
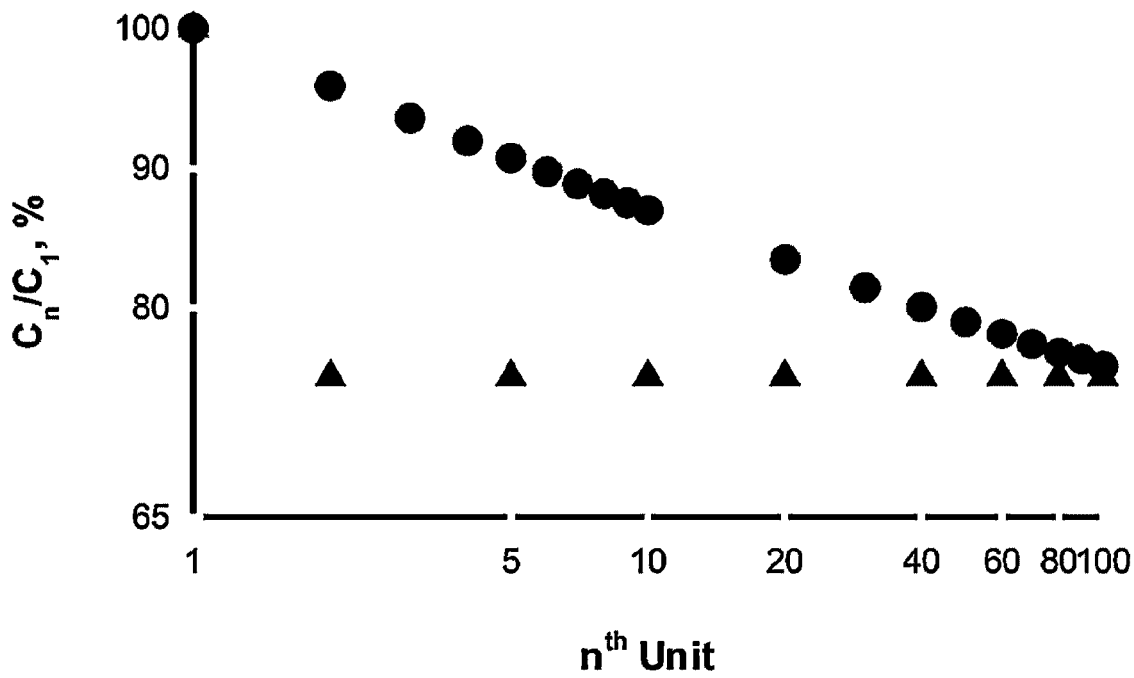
FIG. 12 Numbering up (high pressure configuration) reduces capital cost for the nth unit after the 10th. The FIG. reports only the units following the 10th. Red circles according to literature [68], green triangles following our estimation.

Modular and mobile units are easy to build, quick to install but require capital cost minimization. Costs drop for each additional unit manufactured due to experience and learning [64, 65, 66, 67]. The capital cost of first 10 2.0 MPa units is 550 000 USD and it decreases to 87% for the 20th unit and 76% for the 110th unit (FIG. 12) [68]. We applied a mean learning elasticity factor (β) of −0.36, which is typical for chemical plants (Eq. 9) [69, 65].

$$C_{i+k} = C_{0,k} \left( \frac{n^{kth}}{n^{i+kth}} \right) \qquad (9)$$

Construction costs drop 70% and engineering costs to 41% after the 5th unit, and so its costs will correspond to 75% of the first unit. In the case of the MRU, cost normally considered for traditional chemical plant construction decreases or vanish as contingency, engineering and start-up given the learning experience higher being the final unit price equal to 400 000 USD. In this case operating an MRU unit becomes attractive even before additional profit coming from the heat integration.

5. Conclusions

In this study, we presented a techno-economic analysis to convert flared natural gas to FT liquid hydrocarbons in Canada. A high pressure (2.0 MPa) CPOX reaction step with air is economic compared to a low pressure CPOX step. High selectivity towards CO and $H_2$ and high methane conversion are favored at low pressure, but at 1000° C. syngas yield approaches 90% even at high pressure. Low pressure CPOX requires interstage cooling and expensive compressors that operate with $H_2$. The CPOX reactor run adiabatically at 2.0 MPa with air at a $CH_4/O_2$ ratio of 1.45 while operating within the flammable limits. Integration of the unit within the existing battery facilities minimizes CAPEX while making possible to the current operators to monitor the process.

The micro-GTL unit generates a profit below 35 000 USD, assuming that oil-battery operators monitor it as part of their regular duties. We neglect the carbon tax in the calculation, which may add more than 7000 USD to the balance sheet.

The final carbon efficiency involving SCT-CPOX and single pass FT, considering the carbon molecules entering and the one leaving the MRU as liquid products, is as low as 47%. While it is possible to reach higher syngas yield increasing the reaction temperature, the final FT CO conversion and selectivities mainly depends on catalyst design. The heat integration could generate energy that reduces compression and energy costs at the expense of increasing the capital investment.

The scope of the claims should not be limited by the preferred embodiments set forth in the examples but should be given the broadest interpretation consistent with the description as a whole.

REFERENCES

The present description refers to a number of documents, the content of which is herein incorporated by reference in their entirety. These documents include, but are not limited to, the following:

REFERENCES

[1] Schulz, H., Short history and present trends of Fischer-Tropsch synthesis, Appl Catal A 1999; 186:3-12.
[2] Dry, M. E., The Fischer-Tropsch process: 1950-2000, Catal Today 2002; 71:227-241.
[3] Lee, C. J., Han, C., Comparative economic analysis of gas-to-liquid processes for optimal product selection, In: Alfadala, H. E., Reklaitis, G. R., El-Halwagi, M. M., editors, Proceedings of the 1st Annual Gas Processing Symposium; vol. 1 of Advances in Gas Processing, Amsterdam: Elsevier; 2009, p. 354-361.
[4] Hoek, A., Kersten, L., The Shell Middle Distillate Synthesis Process: Technology, products and perspective; vol. 147, 2004, p. 25-30.
[5] Sichinga, J., Buchanan, A., Unlocking the Potential Wealth of Coal Introducing Sasol's Unique Coal-To-Liquids Technology, Johannesburg; 2005.
[6] Hargreaves, N., Roll out of smaller scale GTL technology at ENVIA Energy's plant in Oklahoma City, USA; Presentation at the Gastech Exhibition and Conference, Tokyo, 2017, URL: https://www.velocys.com/press/ppt/Gastech2017_Velocys_FINAL_4.3_web.pdf, accessed: 2020 Mar. 2.
[7] Infra XLT Technology, Technology, webpage available at URL https://en.infratechnology.com/about/strategy/, accessed: 2021 Mar. 5.
[8] CompactGTL Limited, CompactGTL's project in Kazakhstan—the world's first fully commercial modular GTL plant, webpage available at URL: http://www-.compactgtl.com/about/projects/; accessed: 2021 Mar. 3.
[9] Greyrock Energy, Inc., Technology, Greyrock Chemical and Fuel Production, M-50 gas-to-liquid system, webpage available at URL: http://www.greyrock.com/technology/, accessed: 2021 Mar. 3.
[10] Ramberg, D. J., Chen, Y. H., Paltsev, S., Parsons, J. E., The economic viability of gas-to-liquids technology and the crude oil—natural gas price relationship, Energy Econ 2017; 63:13-21.
[11] Mohajerani, S., Kumar, A., Oni, A. O., A techno-economic assessment of gas-to-liquid and coal-to-liquid plants through the development of scale factors, Energy 2018; 150:681-693.
[12] Denchak, M., Paris Climate Agreement: Everything You Need to Know, 2018.
[13] Alberta Energy Regulator, How are wells abandoned?, webpage available at URL: https://wvvw.aer.ca/regulating-development/project-closure/suspension-and-abandonment/how-are-wells-abandoned, accessed: 2020 Mar. 3.
[14] Ismail, O. S., Global Impact of Gas Flaring, Energy and Power Engineering 2012; 4:290-302.
[15] Chen, Y., Xu, J., The shale gas boom in the us: Productivity shocks and price responsiveness, J Clean Prod 2019; 229:399-411.
[16] Ott, J., Gronemann, V., Pontzen, F., Fiedler, E., Grossmann, G., Kersebohm, D. B., et al, Methanol, Wiley; 2012, doi:10.1002/14356007.a16_465.pub3.
[17] Herz, G., Reichelt, E., Jahn, M., Design and evaluation of a Fischer-Tropsch process for the production of waxes from biogas, Energy 2017; 132:370-381, 32
[18] Enger, B. C., Lødeng, R., Holmen, A., A review of catalytic partial oxidation of methane to synthesis gas with emphasis on reaction mechanisms over transition metal catalysts, Appl Catal A 2008; 346:1-27.
[19] Valle, C. R., Perales, A. V., Vidal-Barrero, F., Gomez-Barea, A., Techno-economic assessment of biomass-to-ethanol by indirect fluidized bed gasification: Impact of reforming technologies and comparison with entrained flow gasification, Appl Energy 2013; 109:254-266.
[20] Yang, Q., Yang, Q., Man, Y., Zhang, D., Zhou, H., Technoeconomic and environmental evaluation of oil shale to liquid fuels process in comparison with conventional oil refining process, J Clean Prod 2020; 255:120198.
[21] Bitter, H., Torres, H., Fischer-Tropsch synthesis—an introduction, 2012.
[22] Tucker, C. L., van Steen, E., Activity and selectivity of a cobalt-based Fischer-Tropsch catalyst operating at high conversion for once-through biomass-to-liquid operation, Catal Today 2018; 342:115-123.
[23] Trevisanut, C., Jazayeri, S. M., Bonkane, S., Neagoe, C., Mohamadalizadeh, A., Boffito, D. C. et al., Micro-syngas technology options for GTL, Can J Chem Eng 2016; 94:613-622.
[24] Banaszkiewicz, T., Chorowski, M., Gizicki, W., Comparative analysis of cryogenic and PTSA technologies for systems of oxygen production, AIP Conference Proceedings 2014; 1573(1):1373-1378, doi:10.1063/1.4860866.
[25] Smith, M. W., Shekhawat, D., Chapter 5—catalytic partial oxidation, In: Shekhawat, D., Spivey, J. J., Berry, D. A., editors, Fuel Cells: Technologies for Fuel Processing, Amsterdam: Elsevier; 2011, p. 73-128.

[26] Liander, H., The utilisation of natural gases for the ammonia process, Trans Faraday Soc 1929; 25:462-472.

[27] Padovani, C., Francetti Giorn, P., Incomplete oxidation of methane with oxygen and air, Giorn Chim Ind Applicata 1929; 15:429-432, 33

[28] Prettre, M., Eichner, C., Perrin, M., The catalytic oxidation of methane to carbon monoxide and hydrogen, Trans Faraday Soc 1946; 42:335-339.

[29] Choudhary, V. R., B, P., M, R. A., Beneficial Effects of Noble Metal Addition to Ni/Al2O3 Catalyst for Oxidative Methane-to-Syngas Conversion, J Catal 1995; 157:752-754.

[30] Chin, Y. H. C., Iglesia, E., Elementary steps, the role of chemisorbed oxygen, and the effects of cluster size in catalytic CH4—O2 reactions on palladium, J Phys Chem C 2011; 115:17845-17855.

[31] Chin, Y. H. C., Buda, C., Neurock, M., Iglesia, E., Selectivity of chemisorbed oxygen in C—H bond activation and co oxidation and kinetic consequences for CH4-O2 catalysis on Pt and Rh clusters, J Catal 2011; 283:10-24.

[32] Chin, Y. H., Buda, C., Neurock, M., Iglesia, E., Reactivity of chemisorbed oxygen atoms and their catalytic consequences during CH4-O2 catalysis on supported Pt clusters, J Am Chem Soc 2011; 133: 15958-15978.

[33] Velasco, J. A., Fernandez, C., Lopez Nina, L. G., Cabrera, S., Boutonnet, M., Jars, S. G., Catalytic partial oxidation of methane over nickel and ruthenium-based catalysts under low O2/CH4 ratios and with addition of steam, Fuel 2015; 153:192-201.

[34] Urasaki, K., Kado, S., Kiryu, A., Imagawa, K. i., Tomishige, K., Horn, R., et al., Synthesis gas production by catalytic partial oxidation of natural gas using ceramic foam catalyst, Appl Catal A 2018; 299:219-228.

[35] Lyubovsky, M., Roychoudhury, S., LaPierre, R., Catalytic partial oxidation of methane to syngas at elevated pressures, Catal Letters 2005; 99:113-117.

[36] Seo, Y. S., Shirley, A., Kolaczkowski, S., Evaluation of thermodynamically favourable operating conditions for production of hydrogen in three different reforming technologies, J Power Sources 2002; 108(1):213-225, 34

[37] Chein, R. Y., Hsu, W. H., Thermodynamic analysis of syngas production via tri-reforming of methane and carbon gasification using flue gas from coal-fired power plants, J Clean Prod 2018; 200:242-258.

[38] Wright, H. A., Allison, J. D., Jack, D. S., Lewis, G. H., Landis, S. R., ConocoPhillips GTL Technology: The COPox Process as the SynGas Generator, ACS Division of Fuel Chemistry 2003; 48(2):791-792.

[39] Basini, L., Aasberg-Petersen, K., Guarinoni, A., Østberg, M., Catalytic partial oxidation of natural gas at elevated pressure and low residence time, Catal Today 2001; 64:9-20.

[40] Basini, L. E., Guarinoni, A., Short contact time catalytic partial oxidation (SCT-CPO) for synthesis gas processes and olefins production, Ind Eng Chem 2013; 52:17023-17037.

[41] Frost, L., Elangovan, E., Hartvigsen, J. Production of synthetic fuels by high-temperature co-electrolysis of carbon dioxide and steam with Fischer-Tropsch synthesis, Can J Chem Eng 2016; 94:636-641.

[42] Ostbye Pedersen, E., Blekkan, E., Noble metal promoted CoMn catalysts for Fischer-Tropsch synthesis, Catal Letters 2018; 148:1027-1034.

[43] Tucker, C. L., Claeys, M., van Steen, E., Decoupling the deactivation mechanisms of a cobalt Fischer-Tropsch catalyst operated at high conversion and 'simulated' high conversion, Catal Sci Technol 2020; 10:7056-7066, doi:10.1039/D0CY00929F.

[44] Pauletto, G., Mendil, M., Libretto, N., Mocellin, P., Miller, J. T., Patience, G. S., Short contact time $CH_4$ partial oxidation over Ni based catalyst at 1.5 mpa, Chemical Engineering Journal 2021; 414:128831, doi: 10. 1016/j.cej.2021.128831.

[45] Dybkjaer, I., Aasberg-Petersen, K., Synthesis gas technology large-scale applications, Can J Chem Eng 2016; 94:607-612, 35.

[46] Blumberg, T., Morosuk, T., Tsatsaronis, G., A Comparative Exergoeconomic Evaluation of the synthesis routes for methanol production from natural gas, Applied Sciences 2017; 7:1-23.

[47] Rostrup-Nielsen, J., Christiansen, L. J., Concepts in Syngas Manufacture, Imperial College Press; 2011.

[48] Hohn, K., Schmidt, L., Partial oxidation of methane to syngas at high space velocities over rh-coated spheres, Appl Catal A 2001; 211:53-68.

[49] Zlochower, I. A., Experimental flammability limits and associated theoretical flame temperatures as a tool for predicting the temperature dependence of these limits, J Loss Prey Process Ind 2012; 25:555-560.

[50] Wierzba, I., Wang, Q., The flammability limits of $H_2$—CO—$CH_4$ mixtures in air at elevated temperatures, Int J Hydrog Energy 2006; 31:485-489.

[51] Laviolette, J. P., Patience, G. S., Chaouki, J., Non-premixed fluidized bed combustion of c1-c4 n-alkanes, Fuel 2011; 90:2850-2857.

[52] Wierzba, I., Wang, Q., The flammability limits of $H_2$—CO—$CH_4$ mixtures in air at elevated temperatures, Int J Hydrog Energy 2006; 31:485-489.

[53] Hutchenson, K. W., Marca, C. L., Patience, G. S., Laviolette, J. P., Bockrath, R. E., Parametric study of n-butane oxidation in a circulating fluidized bed reactor, Appl Catal A 2010; 376:91-103.

[54] Patience, G. S., Bockrath, R. E., Butane oxidation process development in a circulating fluidized bed, Appl Catal A 2010; 376:4-12.

[55] Smith, J., Intrinsic safety in hazardous locations, Plant Eng., Jul. 8, 2004, available online at URL: https://www.plantengineering.com/articles/intrinsic-safety-in-hazardous-locations/; accessed: 2021 Mar. 3.

[56] Trippe, F., Fröhling, M., Schultmann, F., Stahl, R., Henrich, E., Dalai, A., Comprehensive techno-economic assessment of dimethyl ether (DME) 36 synthesis and Fischer-Tropsch synthesis as alternative process steps within biomass-to-liquid production, Fuel Process Technol 2013; 106:577-586.

[57] Sandvik, P., Kathe, M., Wang, W., Kong, F., Fan, L. s., High-Pressure Chemical Looping Reforming Processes: System Analysis for Syngas Generation from Natural Gas and Reducing Tail Gases, Energy Fuels 2018; 32:10408-10420.

[58] In: Towler, G., Sinnott, R., editors, Chemical Engineering Design (Second Edition); second edition ed. Boston: Butterworth-Heinemann; 2013.

[59] Jaworski, Z., Pianko-Oprych, P., A comparative thermodynamic study of equilibrium conditions for carbon deposition from catalytic c-h-o reformates, Energies 2018; 11:1177.

[60] Peters, M. S., Timmerhaus, K. D., West, R. E., Plant design and economics for economical for chemical engineers, 5 ed.; New York: McGraw Hill; 2003.

[61] Couper, J. R., Hertz, D. W., Smith, F. L., In: Towler, G., Sinnott, R., editors. Perry's chemical engineers' handbook; ninth edition ed. New York: McGraw-Hill; 2008.

[62] Weinberg, F., Combustion temperatures: The future? Nature 1971; 233:239-241.

[63] Carbon Footprint Ltd, 2020 Grid Electricity Emissions Factors v1.1, Country specific electricity grid greenhouse gas emission factors, last updated June 2020, available at URL: https://www.carbonfootprint.com/docs/2020_06_emissions_factors_sources_for_2020_ electricity_v1_1. pdf, accessed: 2021 Mar. 3

[64] Weber, R. S., Snowden-Swan, L. J., The economics of numbering up a chemical process enterprise, J Adv Manufact & Proc 2019; 1.

[65] Gregory S., P., Dania C., B., Distributed production: Scale-up versus Experience, J Adv Manufact & Proc 2020; 2: e10039.37

[66] Garnett, D., Patience, G., Why do scale-up power laws work? Chem Eng Prog 1993; 89:76-78.

[67] Tsagkari, M., Couturier, J. L., Kokossis, A., Dubois, J. L., Early-stage capital cost estimation of biorefinery processes: A comparative study of heuristic techniques, ChemSusChem 2016; 9:2284-2297.

[67] Merrow E. M., An analysis of cost improvements in chemical process technologies, The Rand Corporation, May 1989, URL: https://www.rand.orq/content/dam/rand/pubs/reports/2006/R3357. pdf; accessed 2021 Mar. 3.

[69] Lieberman, M. B., The learning curve, technology barriers to entry, and competitive survival in the chemical processing industries, Strategic Management Journal 1989; 10(5):431-447, doi:10.1002/smj.4250100504.

M. Himmel, T. Vinzant, S. Bower, and J. Jechura, "BSCL Use Plan: Solving Biomass Recalcitrance" Technical Report NREL/TP-510-37902 August 2005

U.S. Pat. No. 4,108,891;

U.S. Pat. No. 9,255,051;

U.S. Pat. No. 9,556,092;

U.S. Pat. No. 10,287,224;

EP patent application no. 85108950.8

The invention claimed is:

1. A natural gas refining unit for converting natural gas into a refined product at a battery site of an oil production facility, the battery site being equipped with one or more of a pipeline delivering an oil-water emulsion from an oil field to the battery site; a treater for separating the oil-water emulsion into crude oil, water, and a gas phase comprising natural gas; a crude oil collection system for collecting the crude oil from the treater; a water collection system for collecting the water from the treater; a flare for burning the gas phase from the treater; a gas burner for heating the treater; and an electrical supply, the natural gas refining unit comprising:

optionally, a first vapor-liquid separator in fluid communication with the pipeline,
the first vapor-liquid separator being configured to separate the oil-water emulsion from the pipeline into a gas phase comprising natural gas and a liquid phase and to feed the liquid phase to the treater, and a reactor, or a plurality of reactors connected in series, in fluid communication with the first vapor-liquid separator or, when the first vapor-liquid separator is absent, with the treater,
the reactor or the plurality of reactors being configured to convert the natural gas from the gas phase from the first vapor-liquid separator or, when the first vapor-liquid separator is absent, from the gas phase from the treater into the refined product, wherein the refined product is contained in a liquid/gas mixture, wherein the reactor or the plurality of reactors is:
an oxidative coupling reactor,
a direct methane conversion reactor, or
a methane reformer connected in series with another reactor, wherein the methane reformer is an autothermal reforming (ATR) reactor or a catalytic partial oxidation (CPOX) reactor, wherein the methane reformer is configured to convert the natural gas into syngas, and wherein said other reactor is in fluid communication with the methane reformer and is configured to convert the syngas into the liquid/gas mixture containing the refined product, wherein:
the first vapor-liquid separator is present and configured to feed the gas phase comprising natural gas to the reactor or the plurality of reactors, and the reactor or the plurality of reactors is configured to receive the gas phase comprising natural gas from the first vapor-liquid separator and to feed the liquid/gas mixture containing the refined product to the treater or the first vapor-liquid separator is absent, the reactor or the plurality of reactors is configured to receive the gas phase comprising natural gas from the treater, the natural gas refining unit further comprises a second vapor-liquid separator in fluid communication with the reactor or the plurality of reactors and configured to separate the liquid/gas mixture containing the refined product into an off gas and at least one liquid phase containing the refined product.

2. A battery site of an oil production facility, the battery site comprising one or more of a pipeline delivering an oil-water emulsion from an oil field to the battery site; a treater for separating the oil-water emulsion into crude oil, water, and a gas phase comprising natural gas; a crude oil collection system for collecting the crude oil from the treater; a water collection system for collecting the water from the treater; a flare for burning the gas phase from the treater; a gas burner for heating the treater; and an electrical supply, wherein the battery site further comprises the natural gas refining unit of claim 1.

3. The natural gas refining unit of claim 1, wherein the first vapor-liquid separator is present.

4. The natural gas refining unit of claim 1, wherein the first vapor-liquid separator is absent.

5. The natural gas refining unit of claim 4, wherein the second vapor-liquid separator is configured to release the liquid phase containing the refined product to the treater, thereby heating the treater.

6. The natural gas refining unit of claim 4, wherein the second vapor-liquid separator is a three-phase separator configured to separate the liquid/gas mixture into the off gas, an aqueous phase, and an oil phase containing the refined product, and wherein the natural gas refining unit further comprises a tank for receiving the oil phase containing the refined product phase released from the three-phase separator, or the three-phase separator is configured to release the oil phase containing the refined product phase into the crude oil collection system of the battery site, and/or wherein the three-phase separator is configured to release the aqueous phase into the water collection system of the battery site, and/or wherein the second vapor-liquid separator is configured to release the off gas to the gas burner of the battery site or to the flare of the battery site.

7. The natural gas refining unit of claim 1, further comprising a heat exchange system circulating a heat transfer fluid and configured to cool a portion of the natural gas refining unit, wherein the heat exchange system comprises at least one cooling heat exchanger installed in said portion of the natural gas refining unit, wherein the heat exchange system is configured to heat the treater and to discharge the heat transfer fluid in the treater.

8. The natural gas refining unit of claim 1, further comprising a heat exchange system circulating a heat transfer fluid and configured to cool a portion of the natural gas refining unit, wherein the heat exchange system comprises at least one cooling heat exchanger installed in said portion of the natural gas refining unit, wherein the heat exchange system further comprises a heating heat exchanger configured to heat the treater, wherein the cooling heat exchanger and the heating heat exchanger are in fluid communication with each other and arranged to send hot heat transfer fluid from the cooling heat exchanger to the heating heat exchanger.

9. The natural gas refining unit of claim 8, wherein the cooling heat exchanger and the heating heat exchanger are further configured to return cool heat transfer fluid from the cooling heat exchanger to the heating heat exchanger, or wherein the heat transfer fluid is water and the heat exchange system is configured to discharge cool heat transfer fluid to the water collection system of the battery site.

10. The natural gas refining unit of claim 1, further comprising a heat exchange system circulating a heat transfer fluid and configured to cool a portion of the natural gas refining unit, wherein the heat exchange system comprises at least one cooling heat exchanger installed in said portion of the natural gas refining unit, wherein the heat transfer fluid is water, and wherein the heat exchange system is configured to use water from the water collection system of the battery unit as the heat transfer liquid, or the heat exchange system is configured to use water from the treater as the heat transfer liquid, or the heat exchange system is configured to use the aqueous phase from the three-phase separator as the heat transfer liquid.

11. The natural gas refining unit of claim 1, wherein the reactor or the plurality of reactors is the methane reformer connected in series with said other reactor, wherein the methane reformer is a catalytic partial oxidation (CPOX) reactor, and said other reactor is a Fischer-Tropsch (FT) reactor.

12. A method of using the natural gas refining unit of claim 1 for converting natural gas into a refined product at a battery site of an oil production facility, the battery site being equipped with one or more of a pipeline delivering an oil-water emulsion from an oil field to the battery site; a treater for separating the oil-water emulsion into crude oil, water, and a gas phase comprising natural gas; a crude oil collection system for collecting the crude oil from the treater; a water collection system for collecting the water from the treater; a flare for burning the gas phase from the treater; a gas burner for heating the treater; and an electrical supply, the method comprising the steps of:

a) collecting the natural gas at the battery site,
b) feeding the natural gas to the natural gas refining unit, and
c) collecting the refined product.

13. The method of claim 12, wherein step a) comprises
feeding the oil-water emulsion to a first vapor-liquid separator, thereby separating a gas phase containing natural gas from the oil-water emulsion,
and collecting the gas phase containing natural gas,
wherein the refined product is contained in a liquid/gas mixture, and
wherein the method further comprises step d) of feeding the liquid/gas mixture to the treater.

14. The method of claim 12, wherein step a) comprises collecting the gas phase containing natural gas from the treater,
wherein the refined product is contained in a liquid/gas mixture, and
wherein the method further comprises step d') of feeding the liquid/gas mixture to a second vapor-liquid separator to separate the liquid/gas mixtures into its constituent an off gas and a liquid phase containing the refined product.

15. The method of claim 14, further comprising the step e) of releasing the liquid phase containing the refined product to the treater, thereby heating the treater.

16. The method of claim 14, wherein the second vapor-liquid separator is a three-phase separator and, in step d'), the liquid/gas mixture is separated into an off gas, an aqueous phase, and an oil phase containing the refined product, and wherein the method further comprises the step e') of releasing the oil phase containing the refined product to a tank or the step e") of releasing the oil phase containing the refined product to the crude oil collection system of the battery site, and/or wherein the method further comprises the step f) of releasing the aqueous phase into the water collection system of the battery site, and/or wherein the method further comprises the step g) of releasing the off gas to the gas burner of the battery site or the step g') of releasing the off gas to the flare of the battery site.

17. The method of claim 12, further comprising the step h) of cooling a portion of the natural gas refining unit using a heat exchange system circulating a heat transfer fluid and configured to cool a portion of the natural gas refining unit, wherein the heat exchange system comprises at least one cooling heat exchanger installed in said portion of the natural gas refining unit, wherein the method further comprises the step i) of heating the treater using the heat exchange system by discharging hot heat transfer fluid from the cooling heat exchanger in the treater.

18. The method of claim 12, further comprising the step h) of cooling a portion of the natural gas refining unit using a heat exchange system circulating a heat transfer fluid and configured to cool a portion of the natural gas refining unit, wherein the heat exchange system comprises at least one cooling heat exchanger installed in said portion of the natural gas refining unit, further comprising the step i) of heating the treater using the heat exchange system by heating a heat exchanger configured to heat the treater using hot heat transfer fluid from the cooling heat exchanger.

19. The method of claim 18, further comprising the step j) of returning cool heat transfer fluid to the cooling heat exchanger, or the step j') of discharging cool heat transfer fluid to the water collection system of the battery site.

20. The method of claim 12, further comprising the step h) of cooling a portion of the natural gas refining unit using a heat exchange system circulating a heat transfer fluid and configured to cool a portion of the natural gas refining unit, wherein the heat transfer fluid is water, and wherein:
  the water is collected from the water collection system of the battery unit and used as the heat transfer liquid,
  or
  the water is collected from the treater unit and used as the heat transfer liquid,
  or
  wherein the aqueous phase from the three-phase separator is used as the heat transfer liquid.

\* \* \* \* \*